(12) United States Patent
Dent

(10) Patent No.: US 6,556,634 B1
(45) Date of Patent: Apr. 29, 2003

(54) MAXIMUM LIKELIHOOD RAKE RECEIVER FOR USE IN A CODE DIVISION, MULTIPLE ACCESS WIRELESS COMMUNICATION SYSTEM

(75) Inventor: Paul W. Dent, Pittsboro, NC (US)

(73) Assignee: Ericsson, Inc., RTP, NC (US)

( * ) Notice: Subject to any disclaimer, the term of this patent is extended or adjusted under 35 U.S.C. 154(b) by 0 days.

(21) Appl. No.: 09/247,609

(22) Filed: Feb. 10, 1999

(51) Int. Cl.[7] .............................................. H04L 27/06
(52) U.S. Cl. ....................................................... 375/343
(58) Field of Search ................................. 375/232, 340, 375/341, 348, 130, 147, 343, 142, 150

(56) References Cited

U.S. PATENT DOCUMENTS

| | | |
|---|---|---|
| 5,151,919 A | 9/1992 | Dent |
| 5,164,961 A | 11/1992 | Gudmundson |
| 5,187,619 A | 2/1993 | Sidman |
| 5,230,003 A | 7/1993 | Dent et al. |
| 5,263,053 A | 11/1993 | Wan et al. |
| 5,305,349 A | 4/1994 | Dent |
| 5,331,666 A | 7/1994 | Dent |
| 5,335,250 A | 8/1994 | Dent et al. |
| 5,557,645 A | 9/1996 | Dent |
| 5,572,552 A | 11/1996 | Dent et al. |
| 5,619,533 A * | 4/1997 | Dent ........................... 375/232 |
| 5,673,291 A | 9/1997 | Dent ........................... 375/262 |
| 5,862,190 A | 1/1999 | Schaffner .................... 375/341 |
| 6,226,315 B1 * | 5/2001 | Sriram et al. ............... 375/140 |
| 6,148,041 A1 * | 11/2001 | Dent ........................... 375/340 |
| 6,363,104 B1 * | 3/2002 | Bottemley ................... 375/148 |
| 6,363,106 B1 * | 3/2002 | Popovic et al. ............. 375/150 |
| 6,366,629 B1 * | 4/2002 | Chen et al. .................. 375/355 |

* cited by examiner

*Primary Examiner*—Chi Pham
*Assistant Examiner*—Kevin M Burd
(74) *Attorney, Agent, or Firm*—Moore & Van Allen, PLLC; Steven B. Phillips

(57) ABSTRACT

A receiver is disclosed for decoding spread-spectrum coded signals received through a multi-path propagation channel to obtain decided information symbols. The receiver includes a correlator for correlating the numerical signal samples with a despreading code over information symbol periods to obtain complex correlations for different time-alignments, each time-alignment corresponding to a different one of multiple propagation paths. The receiver hypothesizes data symbol sequences, and forms channel estimates for each of the multiple propagation paths as a function of the complex correlations and the hypothesized symbol sequences and selects the most likely of the hypothesized sequences to decode the information symbols.

44 Claims, 11 Drawing Sheets

MAXIMUM LIKELIHOOD RAKE RECEIVER FOR USE IN A CODE DIVISION, MULTIPLE ACCESS WIRELESS COMMUNICATION SYSTEM

FIELD OF THE INVENTION

This invention relates to the area of code division, multiple access (CDMA) wireless communication systems, and, more specifically, to decoding signals by a novel maximum likelihood sequence estimation decoder.

BACKGROUND OF THE INVENTION

According to the IS 95 CDMA standard, a base station transmitter receives communication content and translates the content into symbols. The symbols are expanded by a spreading factor to a greater number of chips (the basic measurement of time in a CDMA system) and the chips are scrambled using an access code. The signal is then transmitted along with many other signals on the same frequency. The signal propagates through a dispersive medium and arrives at a receiver via multiple paths (also known as channels), each having a different propagation delay. As a result, each signal is received at the receiver overlapping with copies of itself, and each copy is delayed by one or more chips.

In most radio communications systems, such multi-path signals are out of phase with each other, which causes the signal to interfere with itself, resulting in a drop in received energy and concomitant loss of signal quality. In a CDMA system, in theory, these multi-path signals are added together to increase the signal strength, thus raising the quality of the received signal. To this end, several receivers are used simultaneously in a configuration known as a "rake" receiver, where each receiver.is a "finger" of the "rake." Each finger is timed to receive a different multi-path signal. The signal received at each finger of the rake receiver is delayed to align with the last arriving signal. All of the signals are then added together to increase signal strength. Thus, a rake receiver is designed to receive signals that have propagated through multi-path channels and rely on the so-called processing gain of the combined multi-path signals to suppress interference between the multiple paths.

While the signal strength may be improved by processing gain, symbols may still be incorrectly interpreted because the frequency of the signal may have changed due to multi-path and other well known effects (i.e., Doppler shift, etc.). In some systems, previously-decoded data symbols are used to establish what the channel error (also called "frequency shift" or "frequency error") must have been immediately after decoding the last data symbol and immediately prior to decoding the next data symbol, thus forming a coherent reference. However, coherent references formed in this manner are inaccurate if a previously decoded symbol was in error, leading to error propagation. Therefore, IS 95 transmits a pilot code that is modulated only with known symbols to permit receivers to obtain a coherent reference that is independent of the unknown data symbols being decoded. The pilot code method is only suitable if the pilot code and all information bearing coded signals are transmitted from the same antenna.

Future CDMA systems may wish to exploit smart antenna beam forming by creating a directive beam specific to each signal. Then each signal must carry known symbols with which to establish a per-beam coherent reference. If the proportion of known symbols to unknown symbols is too small, then the coherent reference will be noisy; on the other hand, if the proportion of known to unknown symbols is too large, then the overhead creates inefficiency. This deficiency is resolved if an improved method of using unknown symbols is used to refine the coherent reference or channel estimates.

Prior art rake receivers for Code Division Multiple Access signals are described, for example, in U.S. Pat. No. 5,305,349 to Applicant entitled "Quantized-Coherent Rake Receiver" and in U.S. Pat. No. 5,572,552 to Dent and Bottomley, entitled "Method and System for Demodulation of Downlink CDMA Signals," both of which are incorporated herein by reference. Prior art rake receivers, while being designed to receive signals that have propagated through multipath channels, assume that the processing gain upon despreading the signal is sufficient to suppress interference between the multiple paths. Moreover, prior art coherent rake receivers assume a means to obtain a coherent reference that is independent of the unknown data symbols being decoded. For example, in the U.S. CDMA cellular system based upon the IS 95 standard, base stations transmit a special coded signal known as the pilot, specifically intended to provide a coherent reference for the mobile rake receivers. In U.S. Pat. No. 5,187,619 to Applicant entitled "CDMA Subtractive Demodulation" which is herein incorporated by reference, and in the already incorporated '349 patent, previously decoded data symbols are used to establish what the received signal phase must have been immediately after decoding the last data symbol and immediately prior to decoding the next data symbol, thus forming a coherent reference. However, coherent references formed in the latter manner are inaccurate if a previously decoded symbol was in error, leading again to error propagation.

Other data symbol-assisted methods to provide coherent references exist in the prior art. In particular, for non-CDMA signals, Gudmundson describes, in U.S. Pat. No. 5,164,961, how to determine coherent references for all possible sequences of a limited number of successive symbols and how to use those references in deciding which sequences to retain as decoded sequences. In Gudmundson, later symbol decisions are not used to improve the measure of likelihood for the decoded symbol sequence. However, in U.S. Pat. Nos. 5,557,645 and 5,619,533 to Dent, entitled "Channel Independent Equalizer Device," a method is disclosed whereby the likelihood measure for the decoded symbol sequence is periodically updated to be the value it would have been had the most recent symbol decisions been available from the beginning. Neither the Dent or Gudmundson patents, however, disclose how to apply those techniques to CDMA signals, which is an objective of the invention described below.

When a successive decoder such as described in the above '961, '645 and '533 patents are decoding fading signals, there can be advantages in dynamically selecting between forward and reverse time order for decoding, as disclosed in U.S. Pat. No. 5,335,250 to Applicant, which is herein incorporated by reference.

Pilot symbol-assisted methods to provide coherent references exist in the prior art. In non-CDMA systems, coherent references are determined for all possible sequences of a limited number of successive symbols, which are then used in deciding which sequence to retain as the decoded sequence. In one such system, the likelihood measure for the decoded symbol sequence is periodically updated to the value it would have been had the most recent symbol decisions been available from the beginning.

This invention is directed toward overcoming one or more of the problems set forth above.

SUMMARY OF THE INVENTION

In accordance with one aspect of the invention, a method for decoding symbols in a received signal is disclosed for use in a receiver that receives signals carrying symbols over a plurality of channels, wherein the symbols are selected from a predefined set of symbols. The receiver has a memory storing a plurality of previously hypothesized sequences of symbols and a plurality of cumulative vectors, each describing one of the sequences of symbols. The method comprises the steps of generating a plurality of correlated vectors by correlating the received signal over a plurality of time offsets equal in number to the plurality of correlated vectors, the plurality of time offsets corresponding to selected ones of the plurality of channels, and generating a set of new symbol vectors by combining each of the plurality of correlated vectors with each one of the set of symbols. The method further includes hypothesizing a plurality of extended sequences of symbols by combining each of the plurality of new symbol vectors with each of the plurality of cumulative vectors and determining the most likely sequence of symbols by combining the previously hypothesized symbols and the one of the set of symbols corresponding to the combined cumulative vectors and new symbol vectors with the longest sum square length.

In accordance with another aspect of this invention, the step of generating a set of new symbol vectors comprises multiplying each of the plurality of correlated vectors with each one of the set of symbols. Further, the step of determining the most likely sequence of symbols comprises selecting the set of symbols by maximum likelihood sequence estimation. In accordance with another aspect of the invention, the method further includes the step of storing the selected sequence of symbols as one of the previously hypothesized sequence of symbols and storing the combined cumulative vector and new symbol vector with the longest sum square length as the cumulative vector describing the one of the previously hypothesized sequences of symbols.

According to another aspect of this invention, an improved receiver is disclosed for decoding spread-spectrum coded signals received through multiple propagation channels to obtain decoded information symbols. The receiver comprises a converter for filtering, amplifying, sampling and converting received signals to representative numerical samples, a correlator for correlating the numerical signal samples with a despreading code over each of the information symbol periods to obtain, for each symbol period, complex correlations for different time-alignments between the despreading code and the signal samples, wherein each time-alignment corresponds to a different one of the multiple propagation channels. The receiver further includes hypothesizing means for generating data symbol hypotheses, combining means for combining the symbol hypotheses with the complex correlations to obtain channel estimates, complex vector accumulation means for accumulating the channel estimates corresponding to the same one of the multiple propagation channels for successive symbol hypotheses to obtain cumulative complex vectors and a selector that selects sequences of symbol hypotheses for which the sum of the squares of the lengths of the cumulative complex vectors is greatest.

According to another aspect of this invention, the hypothesizing means is a Viterbi Maximum Likelihood Sequence Estimator, and the complex vector accumulation means includes means for de-weighting of older accumulated channel estimates. The de-weighting may include subtracting means for subtracting the contribution of an oldest channel estimate from the respective cumulative complex vector. Alternatively, exponential de-weighting may be used.

According to still yet another aspect of this invention, the frequency-error compensation means includes means for compensating for phase drift and frequency error, which may include means to rotate the phase angle of previous cumulative complex vectors before accumulating a new channel estimate.

In accordance with another aspect of this invention, the complex vector accumulation means includes compensation means to compensate for inter-symbol interference when the complex correlation for one symbol period is affected by the symbol value in at least one adjacent symbol period. Further, the complex vector accumulation means includes means to compensate for inter-ray interference in which the correlations for one path depend on the parameters of the other paths. The complex vector accumulation means may also include means to compensate the channel estimates before accumulation for the effect of other paths and adjacent symbols.

According to another aspect of this invention, the combining means may multiply the correlations by the complex conjugate of a symbol hypothesis. The spread-spectrum coded signals may comprise pilot symbols already known to the receiver interspersed with information symbols not already known to the receiver. The symbol hypotheses may be a single hypothesis for each of said known pilot symbols combined with multiple hypotheses for each of said unknown information symbols. Further, the number of combined symbol sequence hypotheses retained by the receiver falls to one upon receiving a predetermined number of pilot symbols.

In accordance with another aspect of this invention, an improved receiver is disclosed for decoding spread-spectrum coded signals received through multiple propagation paths to obtain decoded information symbols. The receiver includes a converter for filtering, amplifying, sampling and converting received signals to representative numerical samples and a correlator for correlating the numerical signal samples with a despreading code over each of the information symbol periods to obtain, for each symbol period, complex correlations for different time-alignments between the despreading code and the signal samples. Each time-alignment corresponds to a different one of the multiple propagation paths. The receiver further includes hypothesizing means for hypothesizing data symbol sequences, channel estimation means for forming channel estimates for each of the multiple propagation paths as a function of the complex correlations and the hypothesized symbol sequences and decision means to select the most likely of the hypothesized sequences using the channel estimates, thereby decoding the information symbols.

In accordance with another aspect of this invention, the hypothesizing means is a Maximum Likelihood Sequence Estimator. Further, the channel estimation means may multiply hypothesized symbols with corresponding complex correlations and form a sum of the results, wherein one of the multiplicands is complex-conjugated and the sum may be a weighted sum. The weighting may assign a lower weight to older symbols and a higher weight to more recent symbols and may include frequency and/or phase error compensation.

According to another aspect of this invention, an improved receiver is disclosed for decoding error-correction encoded, interleaved and spread-spectrum modulated signals received through multiple propagation paths to recover information symbols. The receiver includes converter means for filtering, amplifying, sampling and converting received signals to representative numerical samples and correlation means for correlating the numerical signal samples with a despreading code over each of the spread-spectrum modulation symbol intervals to obtain, for each modulation interval, a corresponding set of complex correlations for different time-alignments between the despreading code and the signal samples. Each time-alignment corresponds to a different one of the multiple propagation paths. The receiver further includes information symbol hypothesizing means for hypothesizing sequences of information symbols, error-correction coding means for coding the hypothesized symbol sequences to produce coded modulation symbol sequence hypotheses, de-interleaving means for selecting sets of the correlations corresponding to successive ones of the hypothesized modulation symbols, likelihood estimating means for combining the selected sets of correlations in order to produce a likelihood indication for each of the hypothesized information symbol sequences and selection means for selecting an information symbol sequence having the greatest likelihood indication.

According to another aspect of this invention, the information symbol hypothesizing means may be a Maximum Likelihood Sequence Estimator.

According to yet another aspect of the invention, the likelihood estimating means forms a cumulative estimate of the complex signal amplitude for each of the multiple propagation paths, wherein the cumulative estimates are formed separately for regions of the received signal samples that are widely separated in time.

In accordance with another aspect of this invention, a method is disclosed for decoding spread-spectrum modulated symbols received by multiple propagation paths, including known symbols interspersed with unknown data symbols. The method includes the steps of pilot-filtering, amplifying, sampling and converting received signals to representative numerical samples, correlating the numerical signal samples with a despreading code over each of the spread-spectrum modulation symbol intervals to obtain, for each modulation interval, a corresponding set of complex correlations for different time-alignments between the despreading code and the signal samples. Each time-alignment corresponds to a different one of the multiple propagation paths. The method further includes the steps of initializing a Maximum Likelihood Sequence Estimator to a single starting state including a likelihood indication using sets of correlations corresponding to known pilot symbols interspersed among unknown data symbols, successively hypothesizing unknown data symbols within the Maximum Likelihood Sequence Estimator and combining each new data symbol hypothesis with a corresponding set of correlations and the previous state or states to obtain an expanded number of states. Each of the expanded number of states corresponds to hypothesized sequences extended by one more unknown data symbols and each has an associated likelihood indication. The method includes the steps of selecting sequences having the highest likelihood indications in order to keep the number of states at or below a maximum allowed number of states, combining sets of correlations corresponding to pilot symbols interspersed after the unknown data symbols with the previous state or states in order to obtain a contracted number of states corresponding to a reduced number of hypothesized symbol sequences and selecting from the reduced number of symbol sequences the hypothesized symbol sequence having the indication of highest likelihood, thereby decoding the unknown symbols.

In accordance with another aspect of the method, pilot symbols may be denoted as being interspersed before or after unknown data symbols using a reversed time convention and decoding of some symbols may use only the reversed time convention and decoding of other symbols uses the normal time convention.

BRIEF DESCRIPTION OF THE DRAWINGS

A more complete understanding of this invention may be obtained from consideration of the following detailed description in conjunction with the drawings, in which.

DETAILED DESCRIPTION OF THE INVENTION

Figure 1:
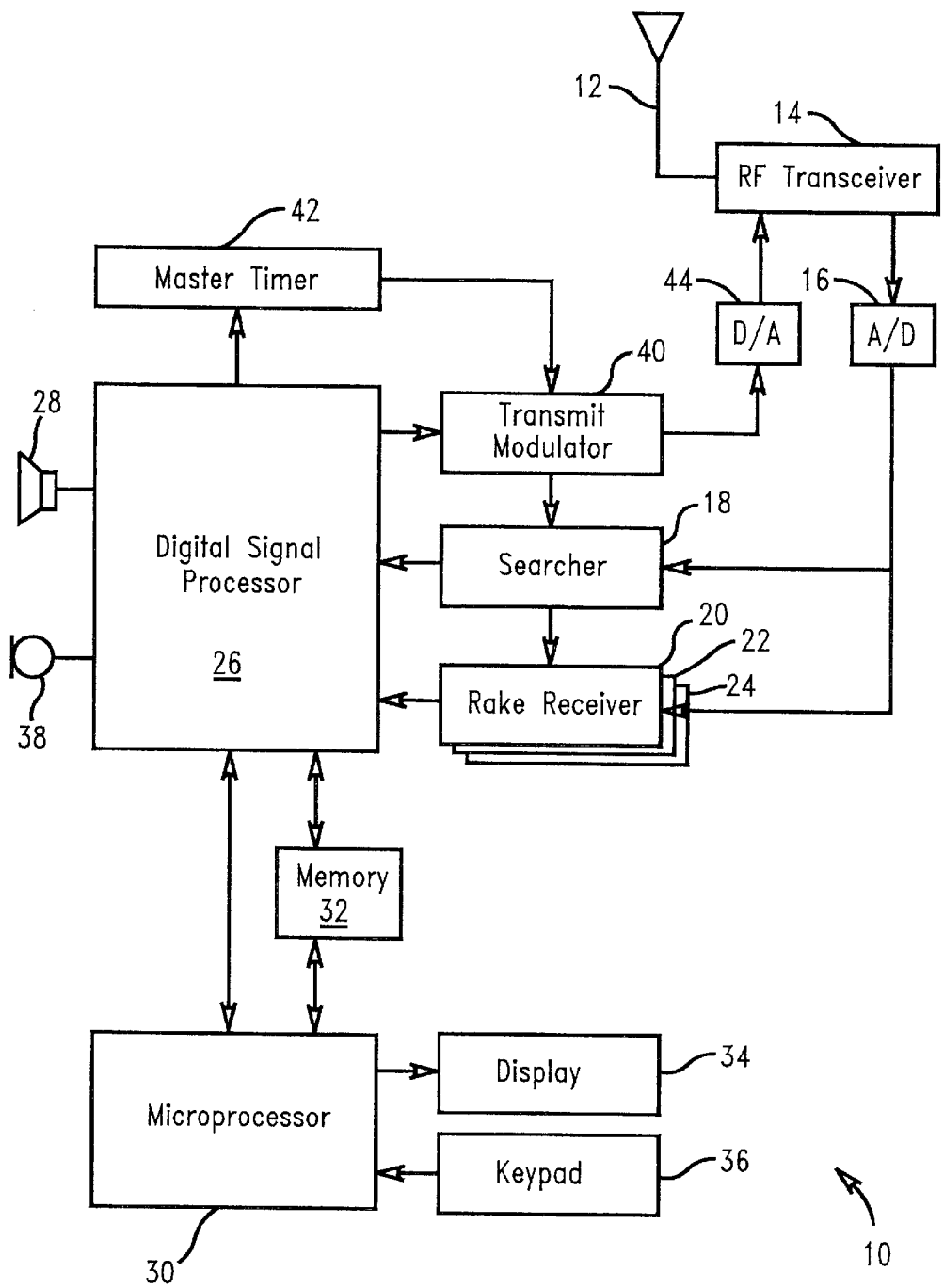
FIG. 1 is a block diagram of a mobile telephone that employs an exemplary embodiment of this invention.

Turning now to FIG. 1, a CDMA wireless telephone 10 is shown in block diagram, which employs an exemplary embodiment of this invention. Radio frequency signals are received at antenna 12 and delivered through RF transceiver 14 to analog to digital (A/D) converter 16 which converts the analog signal into digital samples. A/D converter 16 delivers the digitized signal to a plurality of receivers including searcher 18 and fingers of the rake receiver 20, 22 and 24. Of course, there may be more or fewer fingers. Searcher 18 examines the content of the signal samples to determine a time delay between images of the same signal. The searcher assigns selected time delayed image to a rake receiver fingers 20, 22 and 24 which delay the signal until the last image is received. All signals are then transferred to digital single processor 26, which, according to a preferred embodiment of this invention, includes a Maximum Likelihood Sequence Estimator (MLSE) to determine what symbols are present in the signal. The symbols are then translated through various means into sounds, for example, and are delivered through speaker 28.

Wireless telephone 10 operates under control of a processor 30, which uses data and programs stored in memory 32. The display 34 provides information to the user and keypad 36 provides user input to the processor 30.

Microphone 38 translates speech and/or other sounds into an analog signal and delivers it to digital signal processor (DSP) 26. DSP 26 converts the analog signal into digital form, encodes the signal with error detection and correction information and transfers the signal to transmit modulator 40. Transmit modulator 40 spreads the digital signal using the assigned access code, timed according to the time from master timer 42. The signal is then sent through digital to analog converter 44 so that the signal is in modulated analog form for transmission. The signal is then delivered through RF transceiver 14 and antenna 12.

Figure 2:
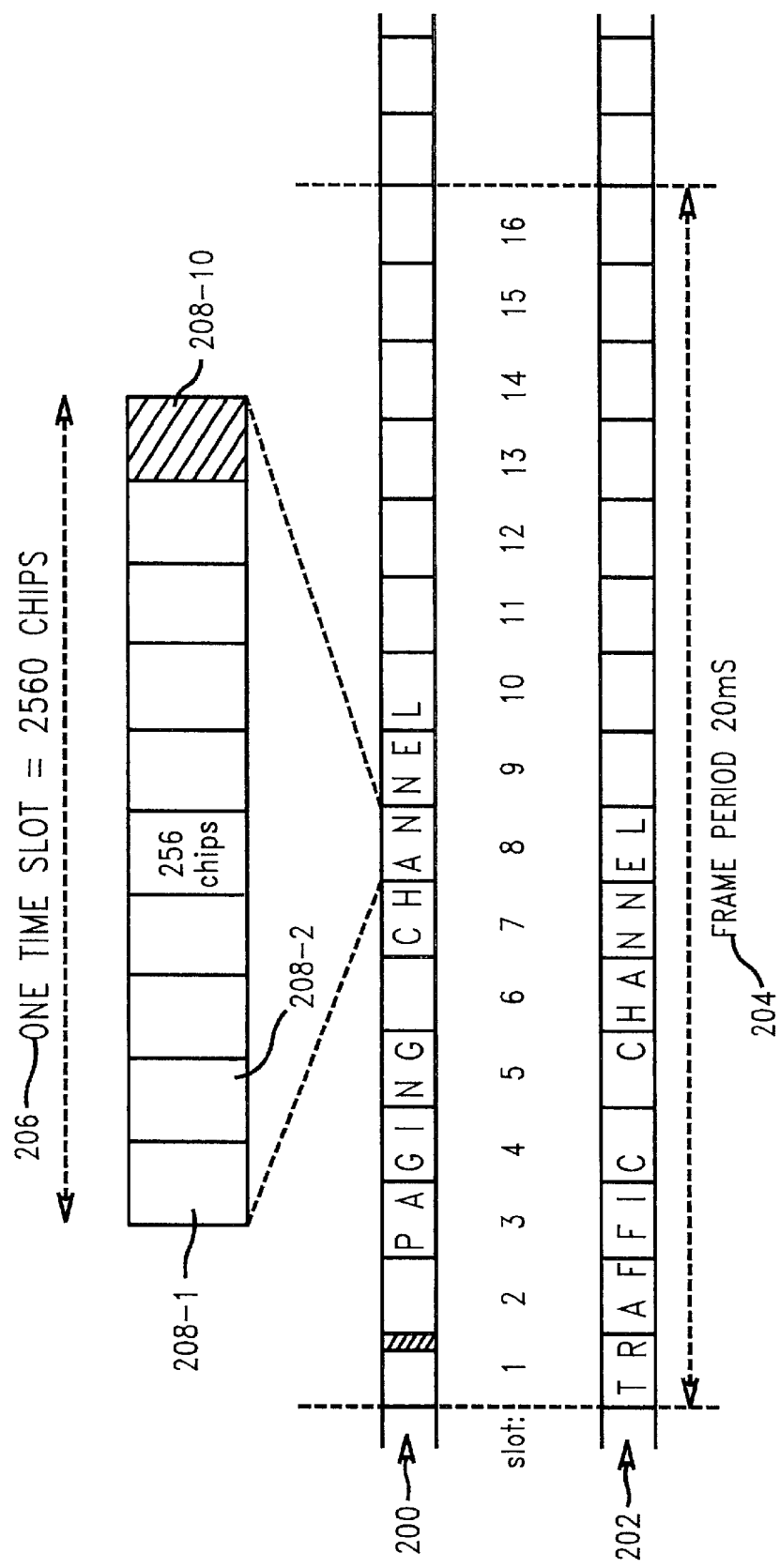
FIG. 2 illustrates a CDMA signal format having pilot symbols inserted periodically between data symbols.

Referring now to FIG. 2, a CDMA signal format transmitted by a cellular base station can include a paging channel signal 200 spread using a first spread-spectrum code and intended for reception by all mobile receivers in the base station's service area. The paging channel signal 200 overlaps the same frequency at the same time as traffic channel transmissions on a traffic channel signal 202 from the same base station, which are each spread using different spread-spectrum codes. At least in the base-to-mobile direction, these different spread-spectrum codes are preferably orthogonal.

Both paging channel 200 and traffic channel 202 are divided into frame periods 204 and each frame period 204 is further divided into timeslots 206. Each timeslot 206, of typical duration 0.625 mS, comprises 2560 chip periods of the spread spectrum code. These 2560 chips can furthermore represent, for example, ten information symbols 208-1 through 208-10, each spread with a 256-chip code. The ten information symbols per timeslot 206 can comprise three pilot symbols known to the receiver prior to decoding and seven data symbols which the receiver does not know prior to decoding. A timeslot 206 may alternatively comprise more or less than ten information symbols, depending on the use of spreading factors greater or less than 256. For example, if a very small spreading factor of 4 is used, the timeslot comprises 640 symbols, of which perhaps 4 would be pilot symbols and 636 data symbols.

The purpose of the pilot symbols is to provide a coherent reference against which to compare the data symbols and decide which data symbols within an alphabet of possible symbols were sent. The purpose of using separate pilot symbols in the paging channel and each individual traffic channel is to anticipate the case where different channels are radiated using separately steered, phased-array antenna beams or using physically separate antennae, in which case coherency between is different channels is hard to guarantee. Therefore, each channel contains its own coherent reference of pilot symbols interspersed with data symbols. Pilot symbols represent an overhead to the transmission of useful data, consuming a fraction of transmitter power that could otherwise have been devoted to data symbols. There is, however, a trade-off between, at one extreme, having no pilot symbols and using non-coherent detection of data symbols, and, at the other extreme, having a great number of pilot symbols to provide an accurate coherent reference but at great overhead cost in terms of transmission efficiency.

This transmission efficiency of pilot symbols may be approximated mathematically. Assume $n1$ pilot symbols are transmitted for every $n2=N-n1$ data symbols. Then the fraction of energy devoted to useful data is $n2/N$. If a coherent reference for demodulation of each of the $n2$ data symbols is based on combining the $n1$ pilot symbols, the noise on the reference after combining will be lower than the noise on a single data symbol by the factor $n1$. Thus, the total noise when demodulating a data symbol against the reference will be higher by the factor $1+1/n1$ than the noise on a data symbol. The total loss in transmission efficiency using $n1$ pilot symbols per $n2$ data symbols in the manner just described is therefore $$(n2/N)/(1+1/n1)=(1-n1/N)/(1+1/n1)$$

For example, when N=10, this expression can be evaluated for $n1$ varying from one to 9 pilot symbols to be as in Table 1.

TABLE 1

| n1 | efficiency |
| --- | --- |
| 1 | 45% |
| 2 | 53.3% |
| 3 | 52.5% |
| 4 | 48% |
| 5 | 41.7% |
| 6 | 34% |
| 7 | 26.3% |
| 8 | 17.8% |
| 9 | 9% |

Thus, the use of pilot symbols in this manner gives, in the best case, barely any improvement over the 50% efficiency (3 dB loss) that would be obtained using differential detection of one data symbol against another.

Known methods exist to improve the above-calculated efficiency based on developing a coherent reference based on more than one block of pilot symbols. This is possible when the pilot symbols are spaced apart in time so that channel fading does not destroy coherency between them. In general, the greater the time spacing of the blocks of pilot symbols, or the greater the speed of the receiver relative to the transmitter, the less correlation will exist between different blocks of pilot symbols.

Methods to utilize data symbols to improve the accuracy of the coherent reference used to demodulate other data symbols have been described in the prior art. Using data symbols to improve the accuracy of the coherent reference generally requires that data symbols that are already demodulated are employed to help demodulate undemodulated date symbols. U.S. Pat. No. 5,164,961 to Gudmundson, which is incorporated herein by reference, describes using undecided symbol hypotheses to form reference vectors with which to compute likelihood indications for the hypotheses, and decodes data by selecting the hypothesis with highest likelihood. In Gudmundson, data symbols decided later benefit from data symbols decided earlier, but the earlier decided data symbols do not benefit from later decided symbols. In U.S. Pat. Nos. 5,619,533 and 5,557,645 to Applicant, which are incorporated herein by reference, the use of later made symbol hypotheses to update the likelihood of earlier-made symbol hypotheses is described, so that the likelihood values associated with a symbol hypothesis eventually converge to the value that would have obtained had the later symbols been known all along. The above Gudmundson patent is applicable when received symbols suffer from inter-symbol interference (ISI) from other symbols due to delayed echoes, otherwise known as time dispersion in a propagation channel with memory. The above-incorporated patents to Applicant are applicable even when the received symbols do not suffer from ISI and have come through a memoryless channel. The disclosed technique comprises a special formulation of the likelihood-indicative values, known as metrics, for symbol hypotheses using recursive least-squares theory.

The current invention provides a means to decode signals, such as CDMA signals, that have propagated through a channel with or without memory, and is based on a different formulation of likelihood-indicative values based on correlations between received signal samples and CDMA access codes.

Figure 3:
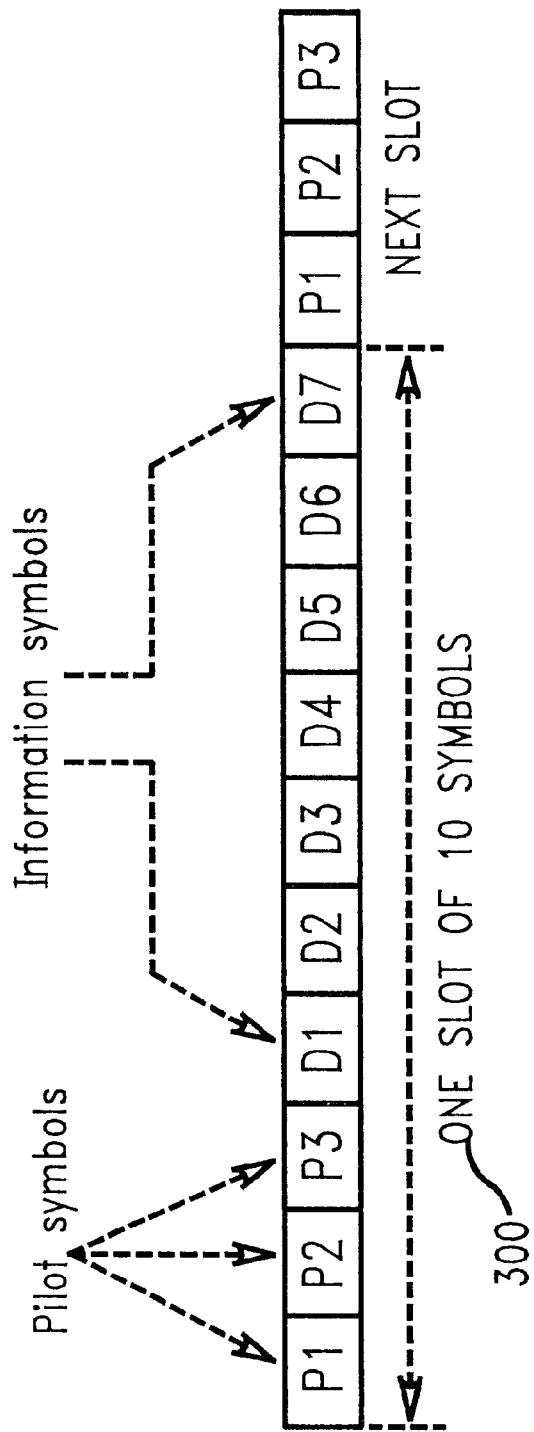
FIG. 3 is a block diagram of one timeslot from FIG. 2 illustrating pilot symbol placement.

FIG. 3 illustrates the insertion of three pilot symbols P1, P2, P3 between every seven data symbols D1, D2 . . . D7 in one timeslot 300. Each pilot symbol has a value already known to the receiver by prearrangement, and so has a number of possibilities equal to unity. On the other hand, each data symbol is unknown to the receiver before decoding, and so can be any symbol in the alphabet. In a binary system, the alphabet consists of only two possibilities, "1" or "0."

Figure 4:
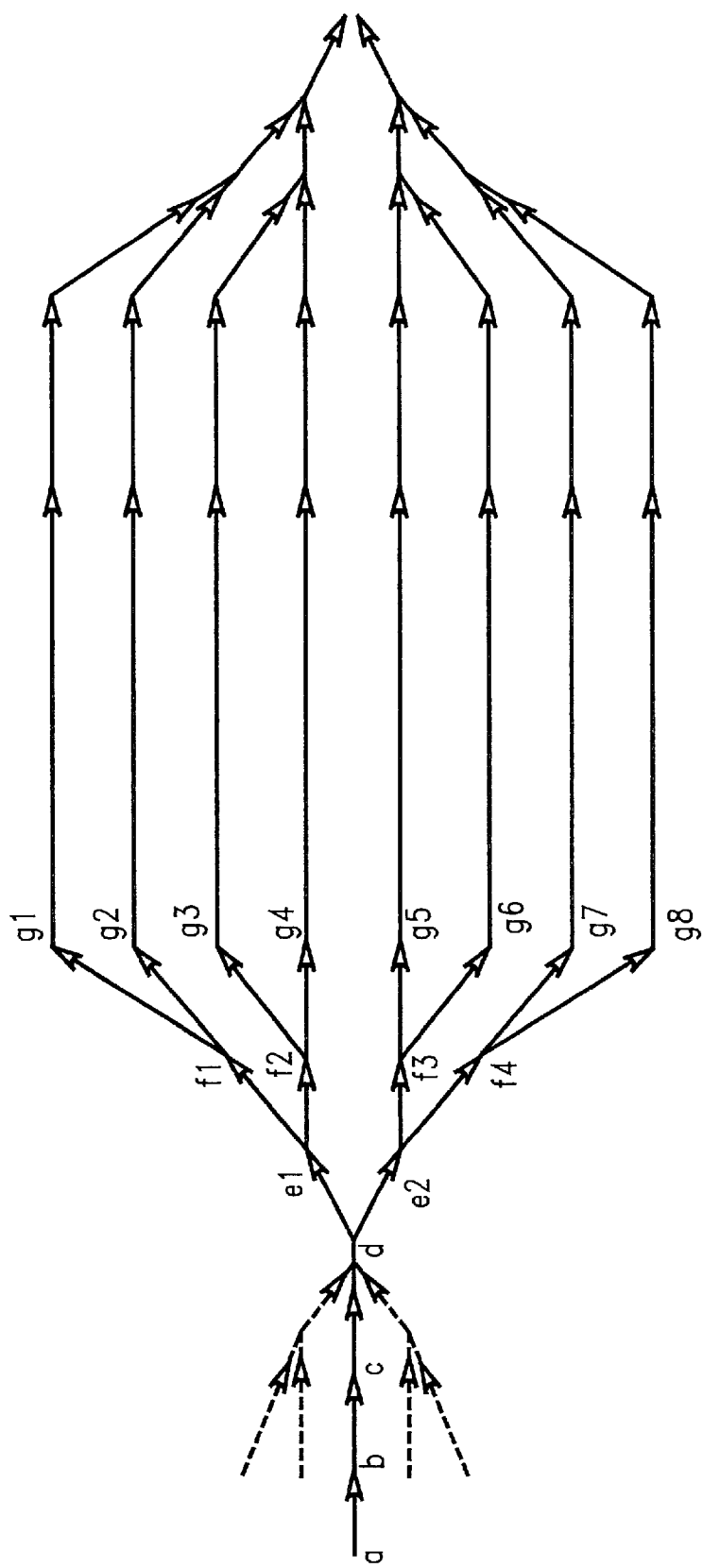
FIG. 4 is a chart of the cumulative number of possible combinations of three adjacent symbols changes over a timeslot from FIG. 3.

FIG. 4 shows how the cumulative number of possibilities for three adjacent symbols changes over a timeslot. Assuming no past history, starting at point "a," there is only one pilot symbol at the beginning of the timeslot. Likewise at points "b," "c" and "d," the past history of three symbols comprises only pilot symbols and, therefore, the number of possibilities for the three-symbol history remains at one. However, point "e" splits into two possibilities, e1 and e2, corresponding to the different possibilities for unknown information symbol D1 (in a binary system). Each of e1 and e2 further splits into f1, f2, f3 and f4 due to the 2:1 uncertainty for the second information symbol D2. Point "g" comprises 8 possibilities, g1, g2 . . . g8, for the three information symbol history D1, D2, D3, but thereafter the number of possibilities remains at 8 as we have restricted discussion to a history of only three symbols. After the last information symbol (D7) has been transmitted in the timeslot, the next timeslot commences with a known pilot symbol P1 again. After transmission of P1, the possible history of the three last symbols collapses from 8 to 4, due to the symbol D5 dropping out of the three symbol window, and its two possibilities are replaced by P1's single possibility. At the end of pilot symbol P3, the past history of three symbols has collapsed to a single possibility once more, corresponding to original point "D." Thus, FIG. 4 illustrates how a timeslot may be decoded using an algorithm that is based on a three-symbol sliding window and evaluates up to eight possibilities or "states" at any one time. The number of states collapses to one at the end of each timeslot when three known symbols occur at the beginning of the next timeslot.

CDMA signal decoding is generally based on correlating the received signal, sampled at one sample per chip, with an access code of length equal to the number of chips per symbol. As described herein, these correlations are assumed to have been done using a correlator to obtain complex correlation values z1, z2, z3 . . . z10 corresponding, respectively, to the symbol periods denoted in FIG. 3 by P1, P2, P3, D1 ,D2 . . . D7. These correlations are processed to determine D1 . . . D7. A brute force method would be to perform a complex addition of the ten correlations using every one of the possible 128 combinations of binary symbols D1 . . . D7. The 128 results are then compared and the correlation having the greatest modulus is selected as the most likely set of seven data symbols D1 . . . D7. Preferably, the complex correlations z11, z12, z13 for the next timeslot's pilot symbols P1, P2, P3 would also be added, making 13×128 complex additions and 128 magnitude comparisons to decide seven data symbols. It is a further object of this invention, however, to significantly reduce this decoding effort, which becomes much larger if the symbols belong to a larger than binary alphabet.

Figure 5:
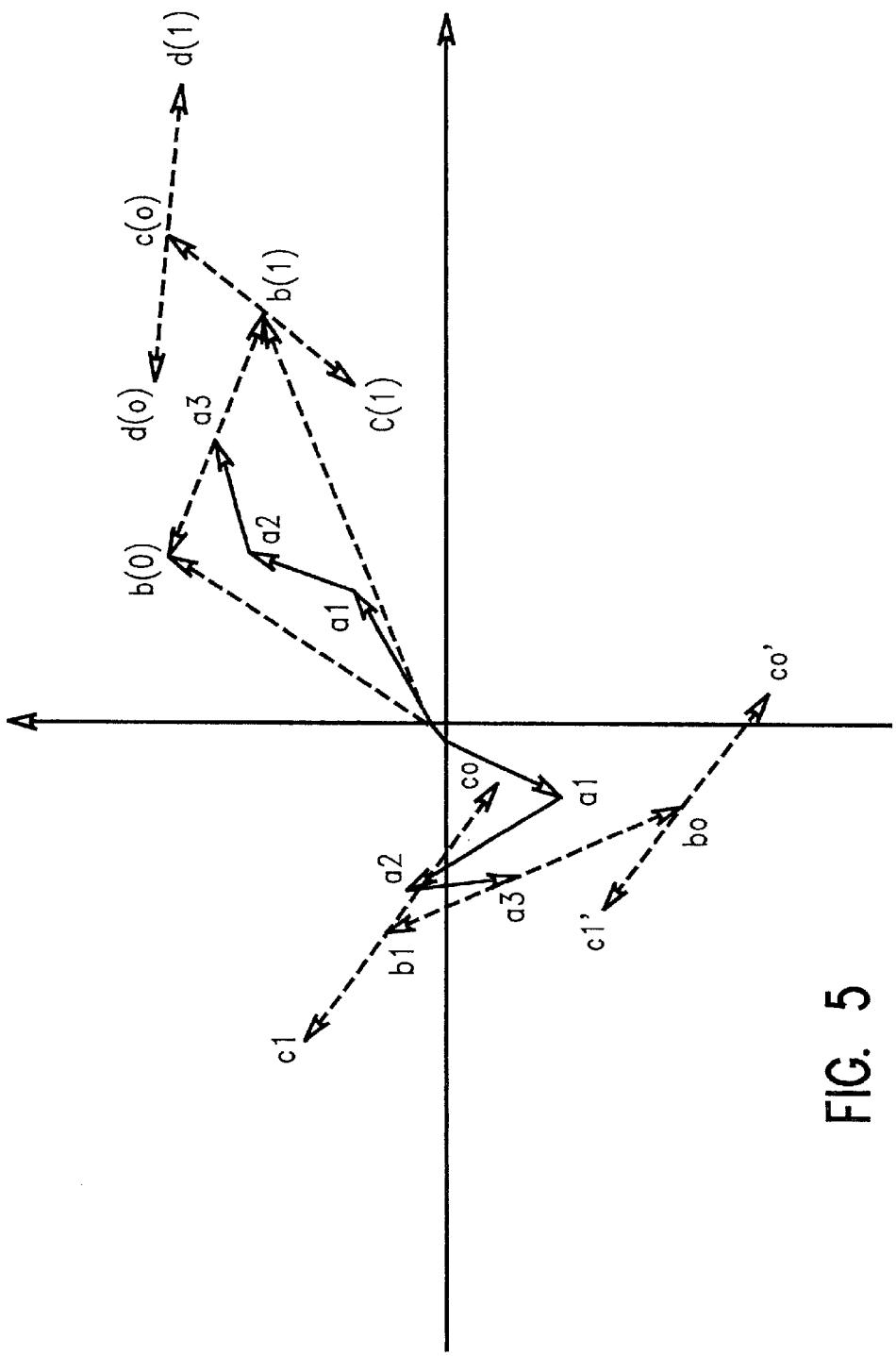
FIG. 5 is a graph of successive combinations of complex combinations.

This invention is based on using the Viterbi algorithm successively to combine correlations corresponding to each successive symbol period, thereby decoding symbols with constant effort per symbol, rather than an effort that increases exponentially with the number of symbols per timeslot. FIG. 5 illustrates successive combination of complex correlations. In the top right quadrant, a first case is illustrated comprising complex vector addition of pilot symbol correlations z1, z2 and z3 to arrive at points a1, a2 and a3, respectively. Point a3 forms the starting point or reference for combining information symbol correlations. If the first information symbol is a "0," the value z4 added to a3 arrives at the point labeled b(0); on the other hand, if the data symbol is a "1," subtraction of z4 from a3 arrives at point b(1). If a decision is taken on the data symbol based on the cumulative vector length to date, the decision would be that D1=1 because b(1) is further from the origin than b(0). Then b(1) is used as the starting point or reference for decoding D2. If D2=0, then addition of z5 to b(1) arrives at point c(0), while if D2=1, subtraction of z5 from b(1) arrives at c(1). Again, if the decision is based on cumulative vector length, the decisions would be D2=0 because c(0) is further from the.origin than c(1). In the top right hand quadrant, the possibility D1=0 combined with D2=1 or 0 was never evaluated. The question is whether one of these non-evaluated possibilities might have given an even greater result. If so, then the premature decision of D1=1 made before accumulating z5 would be in error.

How error can arise is more specifically illustrated in the example of the bottom left hand quadrant. Here, pilot symbol correlations z1, z2, z3 are again added to arrive at starting point a3 (lower left hand quadrant). Adding and subtracting z4 gives points b0 and b1, respectively. Deciding D1 at this point would yield D1=0, since b0 is further from the origin than b1. However, leaving D1 undecided and retaining both points b0 and b1 as possible starting points for adding and subtracting z5 results in the four points c0, c1, c0' and c1', corresponding respectively to D1, D2=10, 11, 00 and 01. Point c1 is the furthest from the origin; therefore, the best symbol decision is D1=1 and D2=1, conflicting with an earlier decision that D1=0. This illustrates that making.premature decisions will not guarantee that the cumulative complex vector length will be a maximum, as it should be for determining the most likely set of data symbols.

When a signal propagates from a cellular base station to a cellular phone in an urban environment, reflections from buildings or natural terrain features cause delayed copies of the signal to be received. Indeed, due to possible shadowing or blockage of the direct ray (one copy of the same signal or channel), such reflections are typically the only signals received. Rays of different delays can be discriminated from one another by the receiver if the delay difference between two rays is of the order of one symbol modulation (chip) or greater. The known rake receiver for CDMA signals comprises correlating the composite received signal with the spread-spectrum access code used by the desired signal and averaging the correlation over each information symbol interval to produce a despread value for each information symbol interval. Furthermore, the correlation is performed with 0, 1, 2, etc. chip shifts between the received signal and the access code, the number of chip shifts corresponding to different ray delays expected, and a despread value is produced for each delay and information symbol interval.

The despread values for each delay are then weighted by the conjugate of the expected ray amplitude and phase and added to obtain a combined value for each information symbol interval, from which the information symbol is then decided. The weighting factors used to combine the different rays in a prior art coherent rake receiver are reference vectors that must be derived from pilot symbols or pilot codes as described above in connection with FIG. 5, leading to the illustrated inefficiencies. Correlations using fractional chip-shifts are sometimes employed, but it can be shown that correlations using only whole chip-shifts suffice, providing that all significant correlations are used.

In a first implementation of the present invention, correlations are also performed between the received signal and an access code for different chip-shifts corresponding to different ray delays. However, the invention now performs the complex vector accumulation illustrated in FIG. 5 for each ray separately. A symbol may then be decided by adding the squares of the cumulative vector lengths of these separate accumulations for each possible symbol value, and choosing the symbol value which gives the maximum squared length sum. However, as illustrated in the example of the bottom left quadrant of FIG. 5, it can be better to avoid making symbol-by-symbol decisions. Instead, a Viterbi algorithm may be constructed according to an exemplary embodiment of this invention as shown in FIG. 6.

The operation of this invention will be described in the context of a CDMA rake receiver with four fingers, each finger representing a separate one of the plurality of channels (paths or rays). Further, this invention will be described in the context of binary symbols, that is, each symbol is either a "0" or a "1." Finally, this exemplary embodiment will be described in terms of examining three symbols at a time: two predecessor ("state") symbols and a new hypothesis symbol. As a result, eight separate hypotheses are formed. However, according to another aspect of this invention, only four path histories are stored to reduce the amount of memory required.

Figure 6:
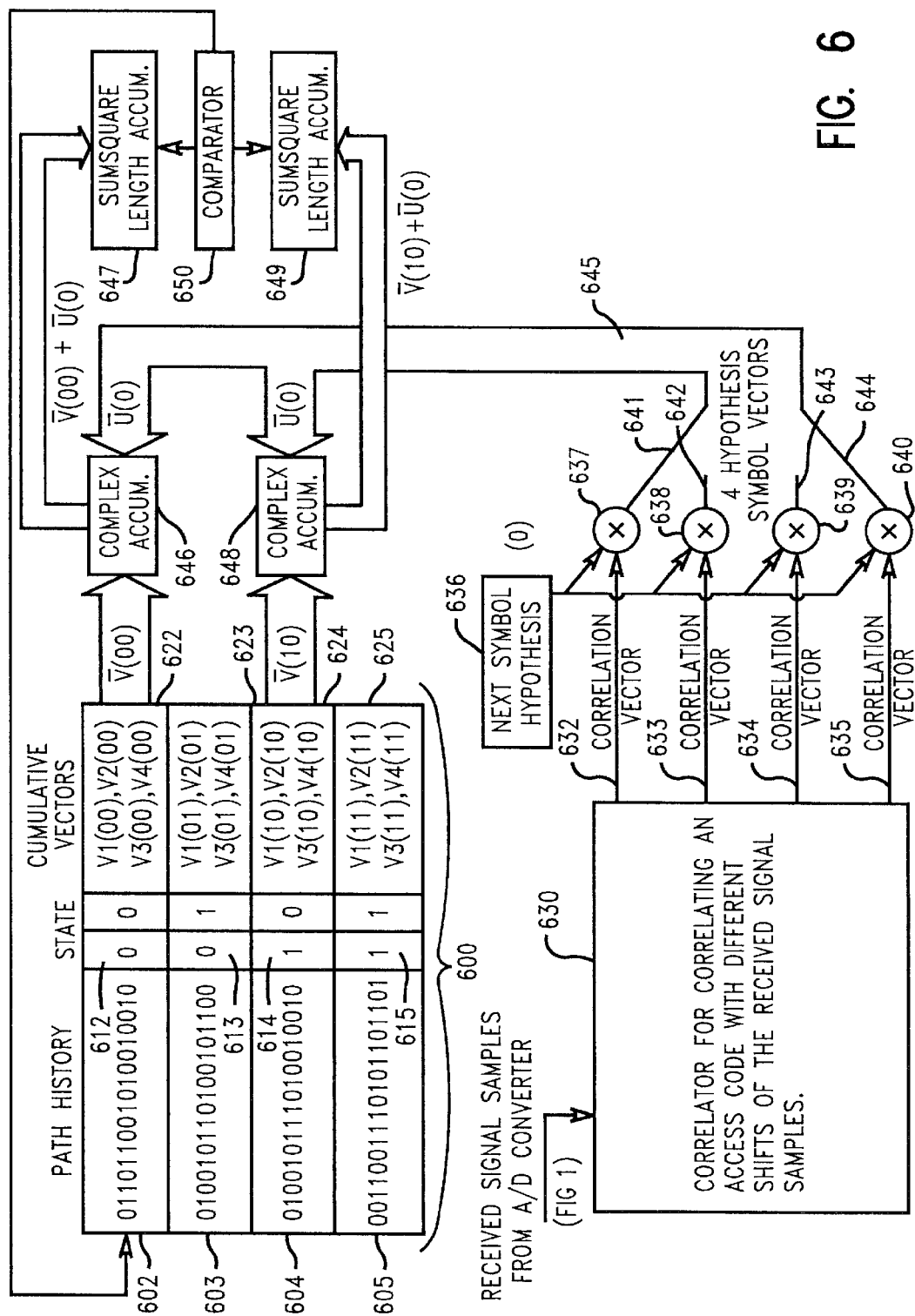
FIG. 6 illustrates a maximum likelihood sequence estimator according to the exemplary embodiment of this invention in a first stage.

In FIG. 6, a memory 600 is shown having four path histories 602, 603, 604 and 605. Each path history is associated with two predecessor state symbol values 612, 613, 614 and 615, respectively, corresponding to the previous two symbols hypotheses. Each path history 602–605 and state 612–615 are associated with four cumulative vectors, 622, 623, 624 and 625, respectively, each one associated with one of the four correlation vectors generated by four rake receiver fingers, and representing the cumulative vector of the respective state.

An analog signal carrying the symbols is received at the RF transceiver 14 (FIG. 1). In RF transceiver 14, the signal is down-converted to an intermediate frequency (so that the decoder does not have to operate at all of the possible transmission frequencies) and filtered in the analog mode at the intermediate frequency. The signal at the intermediate frequency is converted to a numerical representation of the analog signal in A/D converter 16. The numerical representation is made at a sampling frequency of one symbol per sample. Of course, a greater sampling frequency may be used without departing from the scope of the claims. At this point, there is one numerical representation of one sample of an analog signal at the baseband frequency.

The numerical representation of the received signal is delivered to a correlator 630. The correlator generates a correlation of the signal with the CDMA access code(also called long code or despread code) at four (in this example) time offsets corresponding to the four different channels (paths) that may be present in this sample. Each of the four correlations is described in an individual correlation vector yielding four correlation vectors 632, 633, 634 and 635. In each correlation vector, a numerical representation (the "vector") describes the results of "despreading" (removing the spreading code from the signal).

If the signals were precisely at the baseband frequency (that is, the intermediate frequency), and the different channels arrived precisely at the selected time offsets, then the four correlation vectors would be equal and the numerical value would perfectly represent the transmitted symbol. Since the symbols received have propagated over many paths and have undergone change, other methods are used to determine what the symbol most likely is. This is achieved using a variation on the maximum likelihood sequence estimation algorithm (Viterbi) as follows.

The maximum likelihood rake receiver according to this exemplary embodiment of this invention combines each of the four correlation vectors 632–635 with a hypothesis of what the symbol may be. The hypothesis is determined in next symbol hypothesis generator 636. In this binary example, there are two possible symbol hypotheses, "0" and "1."

According to this exemplary embodiment of this invention, the likelihood of a sequence of three symbols is determined by comparing the sum square lengths of the cumulative vectors (the square of the absolute value of the vector's length) to that for other sequences of the three symbols. Two previous symbol hypotheses are combined with a new symbol hypothesis. All of the variations are tested. In the binary example, there are $2^3$ (8) possible combinations. As the vectors are compared, the most likely symbols survive the comparison. These likely symbols are stored in a path history, and a final determination of the symbol is made, as discussed below.

Unlike the prior art MLSE, this invention looks to maximize the length of the vectors as the most likely. In CDMA, if a symbol is likely, then the accumulation of a despread value times the conjugate of the symbol value with a previous cumulative value results in a longer cumulative vector. If the symbol is not in the signal, then the cumulative vector would be shortened.

Thus, in a sequence of three symbols, the most likely sequence of three symbols should have the longest cumulative vectors. As a hypothesized symbol moves through memory 600 (from new hypotheses, states 612–615 to path histories 602–605, described right-to-left in FIG. 6), it becomes more and more likely that the correct symbol survives.

In this exemplary embodiment, each hypothesized state (00, 10, 01, 11) is tested with the new hypothesized symbol (0 or 1) to find the four successor states. To find the successor state to "00", for example, the hypothesized symbol is "0" and the previous state must be 00 or 10. Whichever is more likely, the symbol on the left is put in the path history. The path history of 00 is replaced with the path history of the more likely predecessor state. One iteration of the exemplary embodiment of the inventive MLSE method follows.

The first symbol hypothesis in this example is "0". The first hypothesis for the three symbols is "000"to determine a new state "00". The symbol hypothesis "0" is multiplied with each of the four correlation vectors 632–635 in multipliers 637, 638, 639 and 640, to form four hypothesized symbol vectors 641, 642, 643 and 644, each one corresponding to a channel (correlation vectors 632–635). The four hypothesized symbol vectors 641–644 together form a complex column vector 645 denoted in FIG. 6 by U(0). Next, U(0) is combined (by vector addition) with the complex column cumulator vector V(00) that represents predecessor state "00" in complex accumulator 646, resulting in the complex vector V(00)+U(0). The sum square length of V(00)+U(0) is calculated in an accumulator 647, which forms the inner product of V(00)+U(0) with the conjugate transpose of itself.

Next, the hypotheses vectors for the hypothesis "100" (hypothesizing that "10" is the predecessor state and "0" is the new symbol) are created by multiplying the hypothesis "0" with each of the four correlation vectors 632–435 in multipliers 637–640 to form four hypothesized symbol vectors 641–644. The complex column vector U(0) is added to the cumulative vector V(10) in complex accumulator 648 to form the vector V(10)+U(0). The sum square length of vector V(10)+U(0) is calculated in accumulator 649. Of course, accumulators 646, 647, 648 and 649 may be one time-shared accumulator, or may be more than one.

In this exemplary embodiment, only four out the eight possible path histories are stored. Therefore, the sum square lengths of V(00)+U(0) and V10)+U(0) are compared in comparator 650 to determine which is longer. In this exemplary embodiment, the longer the vector sum square length, the more probable the symbol hypothesis is. Assuming, for purposes of explaining this exemplary embodiment that the vector V(10)+U(0) is longer, then vector V(10)+U(0) is stored as the new cumulative vector V(00) 622 for state 00. The path history 605 for state 10 is copied into the path history 602 for state 00. Finally, a 1 is left-shifted into the new path history 602 of state 00 to reflect the "1" of state 10. Thus, two states (of the eight) that have the same two rightmost bits with different leftmost bits have been hypothesized and the more likely selected and stored, which is equivalent to making a decision on the leftmost bit given that the two rightmost bits are correct. Since we do not yet know if the two rightmost bits are correct, the above procedure is carried out for all four possibilities of the two rightmost bits.

Figure 7:
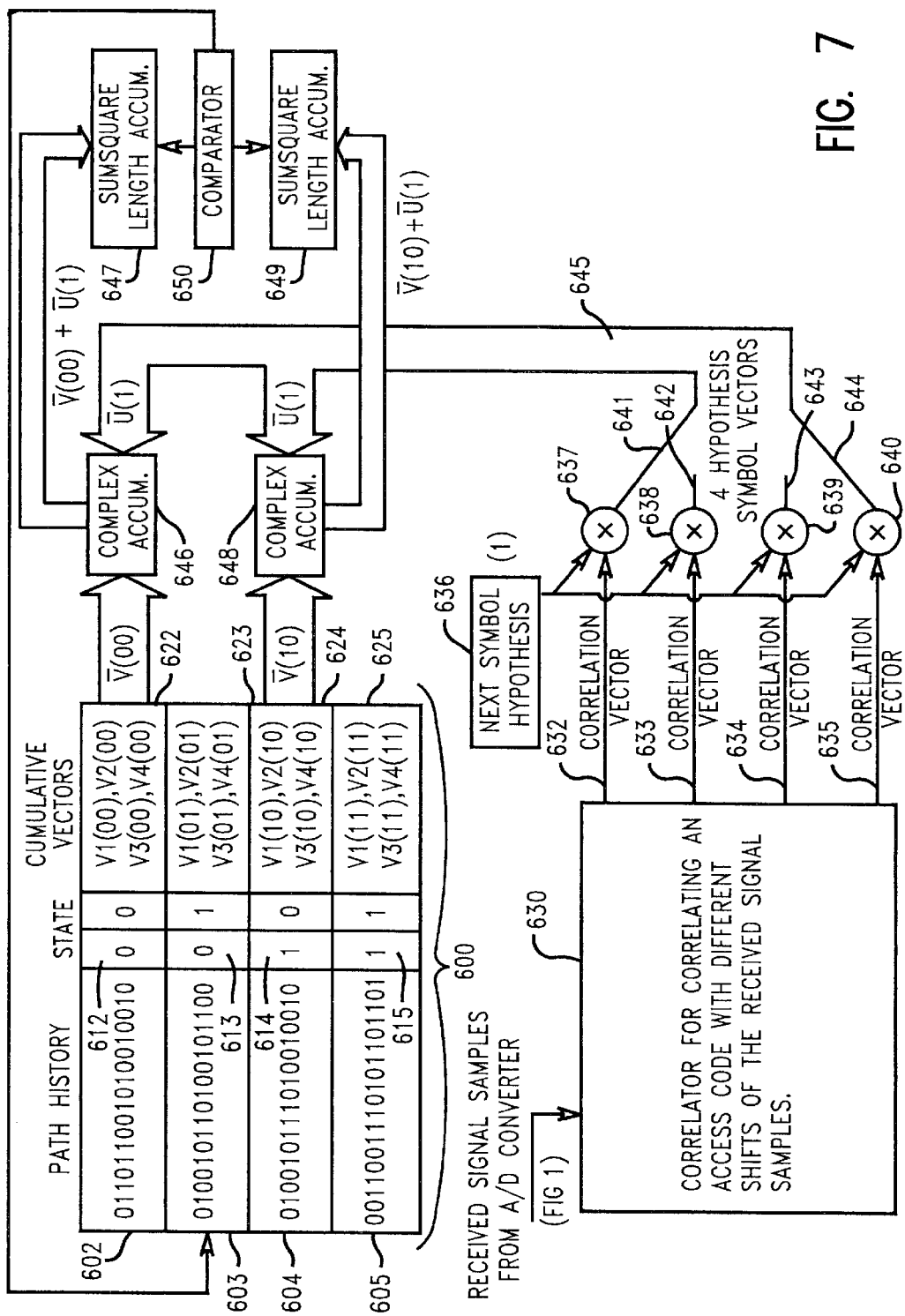
FIG. 7 illustrates a maximum Likelihood Sequence Estimator of FIG. 6 in a second stage.

Turning to FIG. 7, the hypotheses 001 and 101 are tested next (that is, the predecessor states are assumed to be 00 and 10, as above, but the new symbol hypothesis is "1"). The hypothesis "1" is multiplied with the four correlation vectors 632–635 in multipliers 637–640 to form a new complex column symbol vector U(1) 645. U(1) 645 is then added to both cumulative vector V(00) and cumulative vector V(10), as before, in complex accumulators 646 and 648, respectively. Vector V(00)+U(1) represents hypothesis 001, and vector V(10)+U(1) represents hypothesis 101. The sum square lengths of both vectors are calculated in accumulators 647 and 649, respectively. The combined vector with the longer sum square length determined in comparator 650 is written into the cumulative vectors for state 01, and the path history for the longer sum square length is copied into the path history 603 of state 01. Finally, the left-most symbol of the state corresponding to the vector with the longest sum square length is left-shifted into the path history 603 of state 01.

Figure 8:
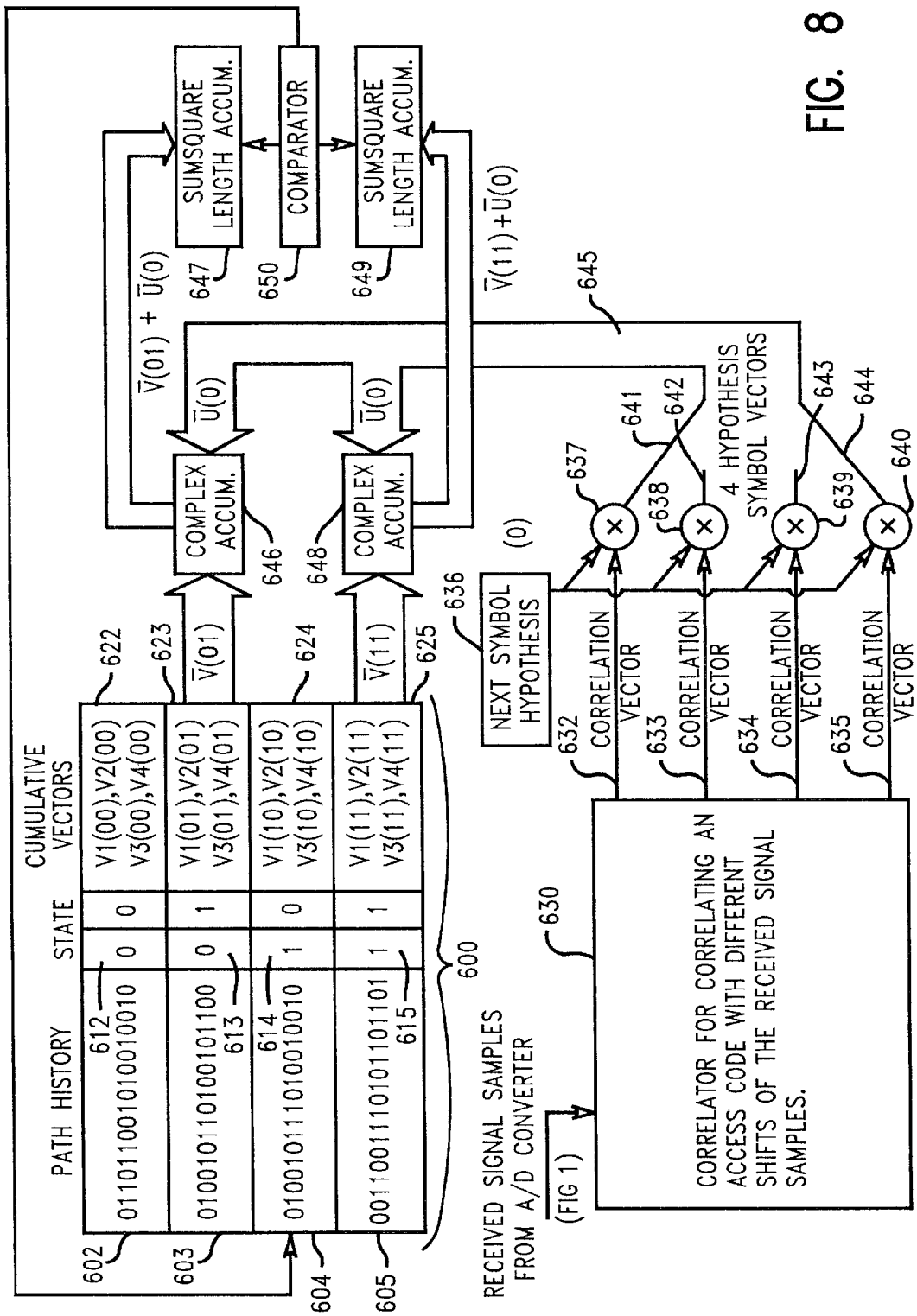
FIG. 8 illustrates a maximum Likelihood Sequence Estimator of FIG. 6 in a third stage.

Turning to FIG. 8, the hypotheses 010 and 110 are now tested to determine the state 10. First, the hypothesis "0" is multiplied by each of the four correlation vectors 632–635 in multipliers 637–640 to form the new symbol vectors U(0) 645. The cumulative vector V(01) 623 is added to vector U(0) to form the vector V(01)+U(0) in complex accumulator 646, and the sum square length is calculated in accumulator 647.

Next, the new symbol vector U(0) is added in complex accumulator 648 to the cumulative vector V(11) 624 to form the vector V(11)+U(0). The sum square length is calculated in accumulator 649. The sum square lengths of V(01)+U(0) and V(11)+U(0) are compared in comparator 650, and the longer hypothesis vector is stored in the cumulative vector V(10) 625, the path history of the state corresponding to the longer vector is written into the path history 604 of the state 10, and the left-most symbol of the state corresponding to the longer vector is left-shifted into the new path history 604 of 10.

Figure 9:
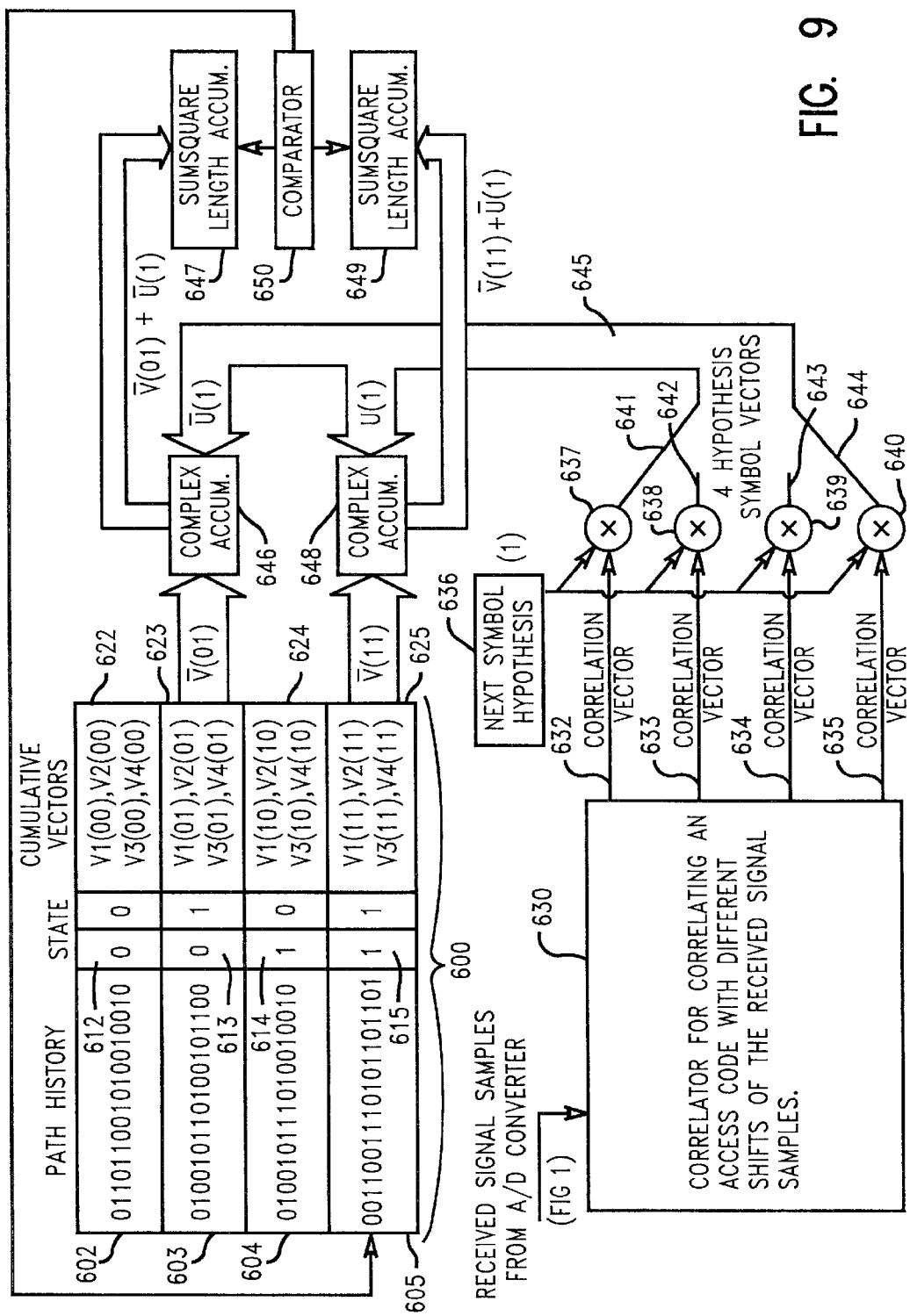
FIG. 9 illustrates a maximum Likelihood Sequence Estimator of FIG. 6 in a fourth stage.

In FIG. 9, the final two hypotheses, 011 and 111, are tested to determine the new predecessor state 11. The hypothesis "1" is added to the four correlation vectors 632–635 to form the new column vectors U(1) 645. U(1) 645 is then added to the cumulative vectors V(01) 623 in complex accumulator 646 to form the vector V(10)+U(1). The sum square length of V(10)+U(1) is then determined in accumulator 647. The column vector U(1) 645 is also added to the cumulative vectors V(1 1) 625 in complex accumulator 648 to form the hypothesis vector V(11)+U(1). The sum square length of V(11)+U(1) is then determined in accumulator 649 and compared to the sum square length of the hypothesis vector V(10)+U(1) in comparator 650. The vector with the longer sum square length is written into the cumulative vector V(11) 625. The path history of the state corresponding to the hypothesis vector with the longer sum square length is written into the path history 605 of state 11. Finally, the left-most symbol of the state corresponding to the hypothesis vector with the longest sum square length is left shifted into the path history of state 11.

At this point, all eight hypotheses have been tested and the best four have been stored. At this time, one Viterbi iteration is complete. Another set of signal samples is then moved into correlator 630 and the process repeats.

When quaternary symbols are used, two bits are conveyed by selecting one of the complex values 1+j, 1−j, −1+j or −1−j to multiply the transmitted access code. Each data symbol then requires four hypotheses and the number of states required to test all possible histories of L successive symbols is then $4^{(L-1)}$. For example, 64 states is required to test all possible sequences of four consecutive quaternary symbols. After receiving each known pilot symbol for a second time at the beginning of the next timeslot, the number of remaining states tapers down by a factor of four, thus again becoming unity after the second P3 (FIG. 3). The number of states encountered during decoding D1 to D7 (FIG. 3) then varies in the sequence 1 4 16 64 64 64 64 64 16 4 1, a total of 361 per timeslot. The total computation of decoding one timeslot is related to this cumulative state count, which can be reduced by adopting a different timeslot format having pilot symbols dispersed more evenly between data symbols, for example in the format P1, D1, D2, P2, D3, D4, D5, P3, D6, D7, P1 .... The state count then evolves in the sequence 1,4,16,16,16,64,16,16,16, then repeats in the sequence 16,16,16,16,16,16, 64,16,16,16, ... which gives a cumulative state count of 208 states per timeslot, a significant reduction in effort compared to clumping the three pilot symbols. Since the number of states does not now collapse to unity at any point, other known methods can be used to make unique decisions on symbols. For example, the growth of the length of past history can be truncated whenever the oldest (left-most in FIG. 6) symbol agrees in all states. Alternatively, the oldest symbol can be selected from the state having currently the longest sum square length to shorten the path histories by one symbol, and deciding that symbol. A person skilled in the art will recognize.that the above algorithm is a Viterbi implementation, but will realize that the algorithm known in the art as the "M" algorithm could be used instead.

When the symbols decided by the above invention are to be further processed by an error correction decoder such as a convolutional decoder, it is desirable to provide "soft" decisions rather than "hard" decisions. How soft decision information may be derived from a Viterbi trellis/MLSE demodulator such as that described above is disclosed in Swedish Patent No. 8903079, (Hammar, filed Sep. 19, 1989) which is incorporated herein by reference. Hammar's method comprises saving the difference of cumulative metrics compared in a comparator such as comparator 650 of FIG. 6. In the present invention, comparator 650 computes the difference of the sum square lengths (for binary symbols) and the difference would either be a positive quantity if a state number beginning with "0" is selected to survive or else a negative quantity if the state number beginning with "1" is selected to survive. The quantity is thus a "soft" indication of the symbol selected to survive which will be left-shifted into the path history for the successor state. Thus, the whole result of the comparison may be saved in the path history instead of just the sign of the comparison. The value saved is equivalent to the soft value that would have been produced by a rake receiver that used the whole past history of symbol decisions plus a number of future symbol decisions as well as the pilot symbols to derive the weighting factors for coherently combining rays. It is equivalent, therefore, to channel estimating using both pilot and data symbols, which reduces the loss of efficiency caused by noise on the channel estimates.

When the symbols belong to an alphabet that is larger than binary, such as quaternary, comparator 650 (FIG. 6) compares a greater number of sum square lengths corresponding to all possibilities of the left-most symbol forming the state number. For quaternary, four values are compared corresponding to two-bit symbols 00,01,10,11. The error correction coding may, however, operate on binary symbols, and the problem then is to derive bitwise soft information from symbol-related values. For quaternary bit pairs b1, b2, the soft information for b1 is the difference in the sum square lengths for 0, b2 and 1, b2 while the soft information for b2 is the difference in the sum square lengths for b1, 0 and b1, 1. Thus, two bitwise soft values may be derived from the four sum square lengths compared by comparator 650, and similarly for higher order symbol alphabets. When calculating soft information from cumulative sum square lengths, it must be scaled to compensate for the growth in the cumulative vector length by dividing by the number of accumulated correlations minus one that make up the current cumulative vectors. Preferably, the soft information would be scaled by a function of the number of accumulated vectors to properly account also for the increased accuracy, i.e., lower relative noise, on the longer vectors. Alternatives to such variable scaling are disclosed below.

Figure 10:
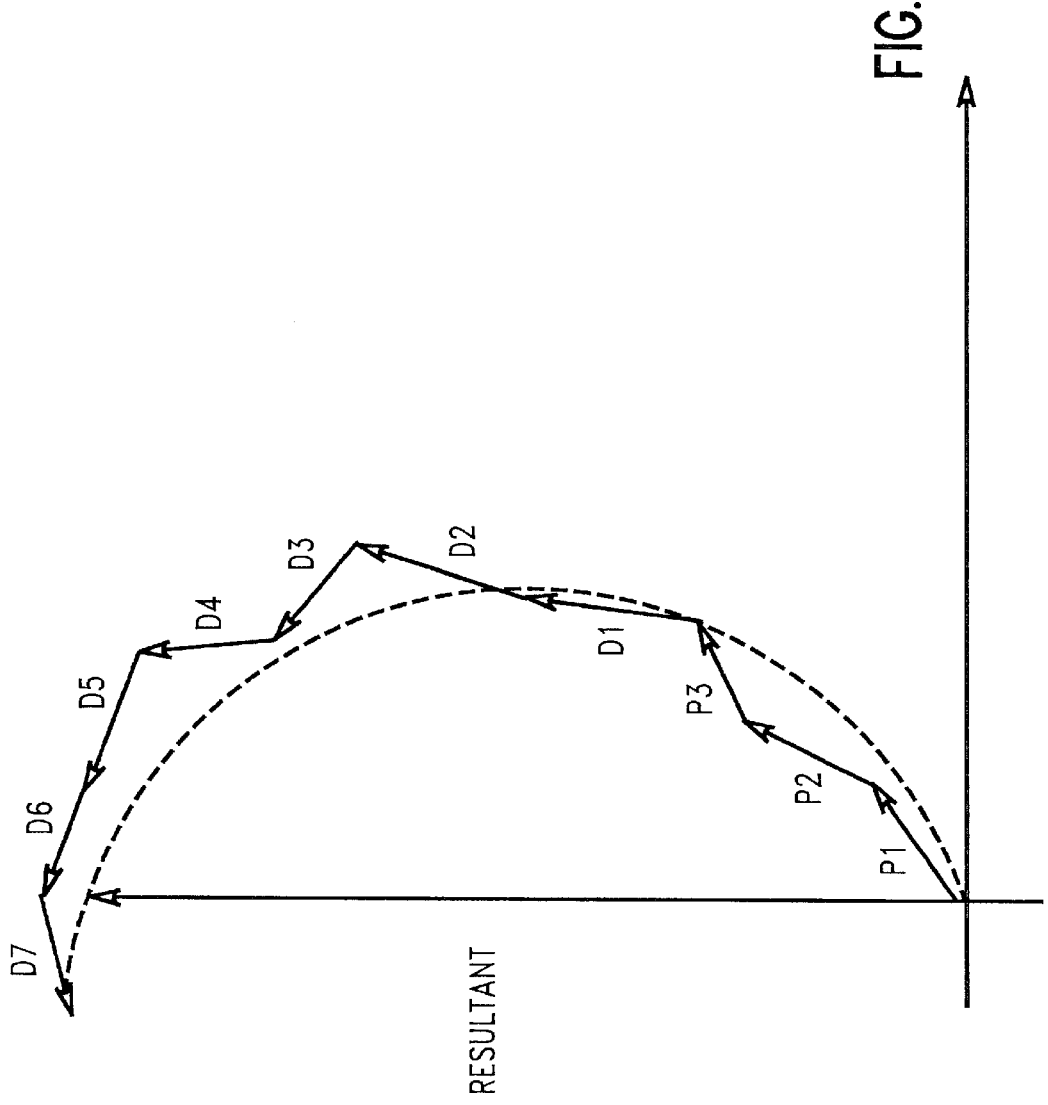
FIG. 10 is a graph of the effect of systematic phase change over a timeslot on complex vector accumulation.

When a mobile receiver moves relative to a base station transmitter, the phase and amplitude of each ray changes due to Rayleigh fading. If the rate of change is too rapid such that the phase of a ray changes over one of the timeslots of FIG. 2, a reference vector computed from pilot or data symbols at the beginning of a timeslot may not represent a valid reference for coherently decoding symbols at the end of a timeslot. This is one reason for choosing timeslot durations of only 0.625 mS, which guarantees that the phase change over one timeslot will be limited for reasonably expected speeds of movement of the mobile station. There can, however, still be receiver performance degradation due to such phase change. The effect of systematic phase change over a timeslot on complex vector accumulation is illustrated in FIG. 10. Due to systematic phase drift, the vector contributions from pilot symbols P1, P2, P3, D1 . . . D7 (FIG. 3) do not add on average along a line, but slowly rotate in phase angle forming a spiral. The current resultant is a chord of the spiral, which, by the time D7 is reached, is at right angles to the true phase of the symbol and no longer a valid reference. Methods to prevent the spiralling phenomenon due to systematic phase drift in the same direction all fall under the heading of "channel tracking." One method of straightening out the spiral comprises estimating the systematic rate of change of phase, that is the mean frequency error, and applying a compensatory rotation either to received values or to the previous cumulative vector before adding a new contribution. This is known as automatic frequency correction (AFC). AFC within a Viterbi algorithm is described in U.S. Pat. Nos. 5,099,499, 5,093,848 and 5,136,616, which are herein incorporated by reference. In the current invention, separate AFC is preferably used for each ray of distinct delay, rather than using a common, overall AFC, although both can also be used.

A different method of compensating for propagation variations in each ray is to limit the influence of older signals on the current accumulation values and symbol decisions. This may be accomplished by using, for example, "exponential forgetting." Exponential forgetting may be implemented in complex accumulators (646 and 648) by multiplying the previous cumulative vectors V by a factor $\Lambda$ less than unity before accumulating the new contribution U. This results in contributions to the cumulative vectors from older U values to be reduced by a power of $\Lambda$ equal to their age in symbol periods. Thus, older U values that have possibly rotated considerably in phase will be diminished in their influence and the phase of the resultant will be determined more by most recent symbols.

Another method is to form cumulative vectors V using a fixed number of previous symbols, such as 5, by subtracting the U-values of the symbol 6 earlier. This effectively forms a moving average vector over a rectangular window of 5 symbols. Other filters may also be used to obtain a "cumulative," "smoothed" or "filtered" vector value based on the past history of correlations and symbols in the path history of each state.

When exponential forgetting or finite length history is used to determine cumulative vectors after an initial start-up, the vector length remains constant apart from noise or fading-induced variations and no variable scaling need then be applied to soft information.

When error correction coding is used, the soft symbol decisions supplied to the error correction decoder should not be sequentially selected from adjacent positions in the received signal stream in order to disperse error bursts caused by temporary, short fading outages. Dispersal is effected at the transmitter by interleaving the output of the error correction coder across many timeslots, and at the receiver by a matching de-interleaving process that picks symbols sequentially from different timeslots to apply to the error correction decoder. If the interleaving pattern is properly chosen, it is possible to combine the error correction decoding operation with the above invention into a single Viterbi trellis. The principles of combined demodulation and decoding, known as "decodulation," are described in U.S. Pat. No. 5,673,291 to Applicant, which is incorporated herein by reference.

The method of decodulation comprises hypothesizing a symbol sequence within the error correction decoder, using a model of the encoding process to obtain corresponding encoded symbols, using the known interleaving pattern to determine where in the received signal stream the coded symbols are placed, and, in the present invention, forming cumulative complex vectors for each ray and timeslot using the coded symbols placed in that timeslot. Then the sum of the cumulative length vectors is formed for each symbol sequence hypothesized by the error correction decoder, and those symbol sequences giving the greatest sum square length are retained. The use of a single trellis for combined demodulation and decoding circumvents the need to define the soft information that otherwise must be passed from a separate demodulator to a separate decoder.

Alternatively, two-pass demodulation and decoding may be employed, as also described in the above incorporated '291 patent. Two-pass decoding is particularly useful when some information bits are coded with less redundancy than others. These bits are decoded better on a second pass after deciding the more heavily coded symbols on a first pass. It is also possible to retain the best N sequences and the hypothesis having the greatest sum square length among those N that also meets a zero-error detection criterion may be selected, according to U.S. Pat. No. 5,577,053 to Applicant, which is also herein incorporated by reference.

A delayed ray overlapping an undelayed ray causes the end part of one symbol of the delayed ray to overlap the start of the next symbol period. This causes the received signal during one symbol period to be affected by the previous symbol, the effect being different for different values of the previous symbol. Likewise, a ray of lesser delay is interfered with by a ray of greater delay in dependence on the value of the next symbol. This overlapping is known in the art as inter-symbol interference (ISI). In CDMA systems where ray delays can differ by many chip periods (but not so much as an information symbol period, which is usually a large number of chip periods), the above ISI effects would rarely involve more than 3 adjacent symbols. The greatest ISI effect, however, is the interference between different rays during the overlap time that they are modulated with the same symbol.

Figure 11:
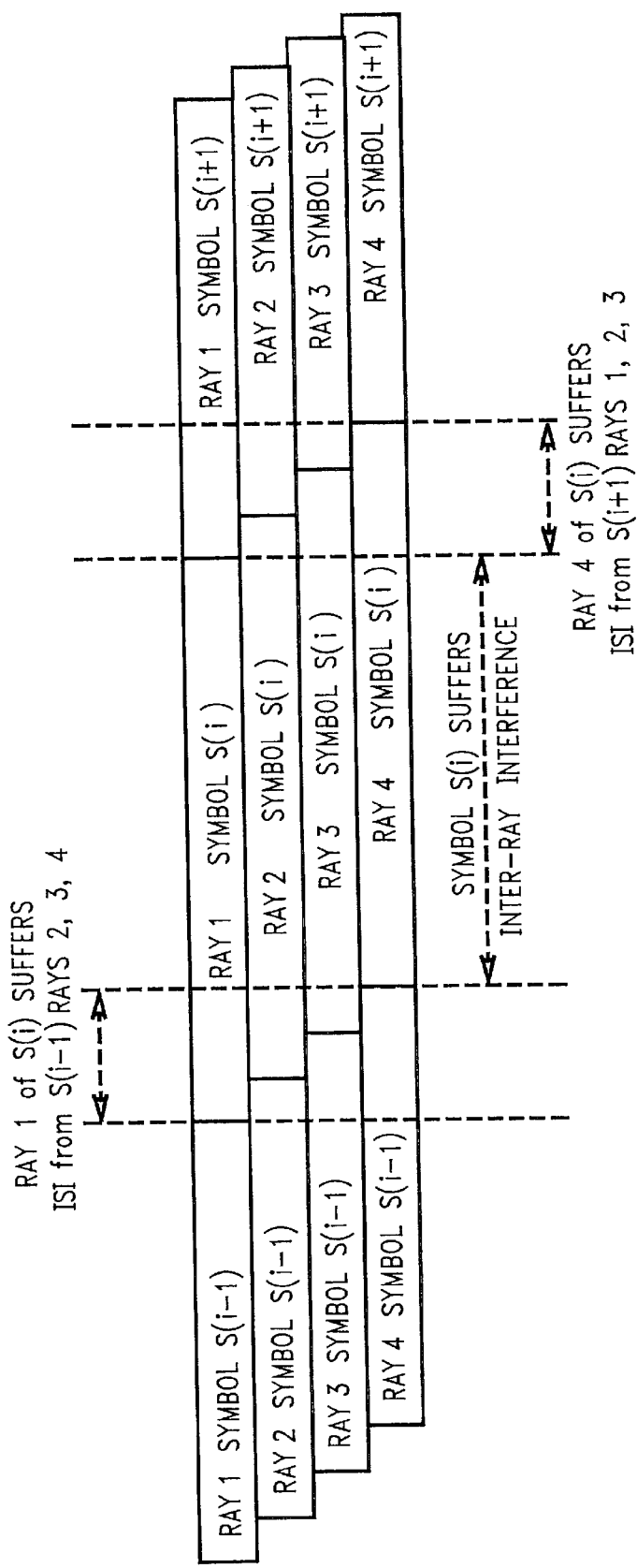
FIG. 11 illustrates four rays of progressively increasing delay causing inter-symbol and inter-ray interference.

FIG. 11 shows four rays, ray 1, ray 2, ray 3 and ray 4 of progressively increasing delay, causing ISI and inter-ray interference. A ray of lesser delay, such as ray 1, modulated with symbol $S(i)$, suffers from ISI due to rays 2, 3 and 4 of greater delay modulated with the previous symbol $S(i-1)$, while a ray of greater delay such as ray 4 modulated with $S(i)$ suffers from ISI from rays of lesser delay modulated with the following symbol $S(i+1)$. In the middle part of symbol $S(i)$ that is not overlapped by previous or following symbols, the rays suffer only from inter-ray interference among themselves depending only on the current symbol $S(i)$.

A CDMA rake receiver conventionally extracts the useful information in ray 1 for symbol $S(i)$ by correlating received samples over the symbol period $S(i)$ of ray 1 with the spreading code used for symbol period $S(i)$. The result, ignoring inter-symbol interference and inter-ray interference effects, would be a complex value $R1.S(i)$ where $R1$ is the complex channel coefficient for ray 1. $S(i)$ may also be a complex value describing the modulation of symbol $S(i)$ upon the transmitted signal. However, due to the small overlap of the end part of ray 2, symbol $S(i-1)$ with ray 1 of symbol $S(i)$ there is an inter-symbol interference (ISI) term $a(2,1).R2.S(i-1)$ between the end part of the previous spreading code used for symbol $S(i-1)$ and the beginning part of the spreading code used for $S(i)$, proportional to the channel estimate $R2$ for ray 2, the modulation of the previous symbol $S(i-1)$ and a coefficient $a(2,1)$. Likewise, rays 3 and 4 give rise to terms $A(3,1).R3.S(i-1)$ and
$A(4,1).R4.S(i-1)$ In addition, that part of ray 2 that is modulated with $S(i)$ and overlaps ray 1 $S(i)$ gives rise to an inter-ray interference term $B(2,1).R2.S(i)$
and likewise rays 3 and 4 give terms
$b(3,1).R3.S(i)$
$b(4,1).R4.S(i)$ Adding all these terms, correlation over the period ray 1, $S(i)$ gives a result including ISI and IRI of $$Z1=(R1+b(2,1).R2-b(3,1).R3+b(4,1).R4)S(i)-(a(2,1).R2+a(3,1).R3+a(4,1).R4)S(i-1) \quad (1)$$

The conventional rake receiver continues to extract the useful information in ray 2 by correlating the signal samples over the period of $S(i)$ in ray 2 with the same spreading code. Thus, a shift of the signal samples corresponding to the delay of ray 2 relative to ray 1 is correlated with the same code as used for ray 1. Now, the result will include a term due to the earlier ray 1 for symbol period $S(i+1)$ overlapping the end of ray 2, symbol $S(i)$, and the net result is:

$$Z2=(b(1,2).R1+b(3,2).R3+b(4,2).R4)S(i)+(a(3,2).R3+a(4,2).R4)S(i-1)+(c(1,2).R1)S(i+1) \quad (2)$$

The value $b(1,2)$ will be the complex conjugate of the value $b(2,1)$ and the value $b(3,2)$ will equal $b(2,1)$ if the delay of ray 3 relative to ray 2 is the same as the delay of ray 2 relative to ray 1 (i.e., equi-spaced delays). In general, however, the values of the correlations a, b and c of a spreading code partially overlapped with itself (delayed) depend on the delay and on the code, but can nevertheless be precalculated. Such precalculation is facilitated if the spreading code used for each successive symbol is the same code, or alternatively changes infrequently.

Likewise, expressions for the correlation result for rays 3 and 4 are:

$$Z3=(b(1,3).R1+b(2,3).R2-R3+b(4,3).R4)S(i)+(a(4,3).R4)S(i-1)+(c(1,3).R1+c(2,3).R2)S(i+1) \quad (3)$$

and $$Z4=(b(1,4).R1+b(2,4).R2+b(3,4).R3+R4)S(i)+(c(1,4).R1+c(2,4).R2+c(3,4).R3)S(i+1) \quad (4)$$

The above expressions (1, 2, 3, 4) may be used to compensate for ISI and IRI during complex vector accumulation as follow. Assuming, for the purposes of explaining this exemplary embodiment, that symbols $S(i-1),S(i),S(i+1)$ belong to an alphabet of M possible symbols, an MLSE process with $M^2$ states is used, and the states correspond to all possible values of symbols $S(i-1)$ and. $S(i)$. Each state comprises storage of associated past symbol history ($S(i-2)$, $S(i-3)$ . . . ) and associated values of four cumulative complex vectors corresponding to the four rays assumed in FIG. 6. After performing four new correlations for symbol period $3(i)$-to.get results $z1$, $z2$, $z3$ and $z4$ given by the above four expressions, the states are to be updated to obtain $M^2$ new cumulative complex vectors associated with all possibilities for symbols $S(i)$ and $S(i+1)$, decisions for $S(i-1)$ being shifted into the path history memories. First, using previous cumulative complex vectors to provide averaged estimates of R2, R3 and R4, expression (1) is used to obtain a new value of R1 to be added to the cumulative complex vector associated with ray 1 stored against each state (S(i−1), S(i)) to obtain new cumulative complex vectors corresponding to ray 1. Obtaining average values of R2, R3, R4 involves merely scaling the cumulative vector value appropriately by the effective number of correlations or channel estimates that have been summed to date.

Now the number of states must be temporarily expanded to $M^3$ corresponding to hypothesizing all M possible values of S(i+1) as well as S(i) and S(i−1). This is to enable expressions (2) and (3), which depend on S(i+1), to be used to obtain values for R2 and R3, which are accumulated with the previous cumulative complex vectors for rays 2 and 3, respectively. It is a matter of choice whether the newest estimate for ray 1 is substituted in expressions (2) and (3) to obtain values for R2 and R3. Likewise, when using expression (3), it is a matter of choice whether the newest value for ray 2 is substituted, using the result for R2 from expression (2).

Now expression (4) contains no further information about S(i−1); therefore, the number of states can now be contracted back from $M^3$ to $M^2$ by choosing, for each given pair of symbol values S(i),S(i+1), that state among those differing only in S(i−1), which has the largest sum square cumulative vector length that is the sum of the cumulative vector lengths squared for rays 1, 2, 3 and 4 is the maximum. The chosen state's cumulative vector lengths are then stored against a new state of index given by the given pair of symbol values S(i),S(i+1), while the value of S(i−1) for the chosen state is shifted into the previous path history for the chosen state to become the new path history for the new state S(i),S(i+1). Finally, expression (4) is used to obtain a value for R4 for each new state which is accumulated with associated cumulative complex vector for ray 4 associated with each state. It is a matter of choice whether the newest estimates for rays 1, 2 and 3 are used in expression (4) to obtain a new value R4. Likewise, it is matter of choice whether expressions (1), (2), (3) and (4) are used iteratively or in some other manner to obtain new values R1, R2, R3 and R4 that each utilize the new values of each other to obtain refined values. This completes one iteration of the MLSE process, advancing the decoding operation from state S(i−1), S(i) to state S(i), S(i+1), saving tentative decisions for previous symbol S(i−1) in the path histories for each state.

As explained previously, when decoding encounters a known pilot symbol, the number of states after an iteration collapses by a factor of M. Thus, encountering a run of two successive pilot symbols will cause the number of states to collapse to one, allowing the decisions for all previous unknown symbols to be extracted from the path history from that single, surviving state. Even without pilot symbols causing periodic reduction to a single state, however, older symbols in the path history may be extracted from the "best state" to truncate the growth of path history in a manner analogous to that known in prior art MLSE processes. In this invention, the "best state" would, for example, be that which, after an iteration, gave the greatest sum square length summed over the cumulative complex vectors associated with all rays used for decoding.

Of course, expressions (1), (2), (3) and (4) may be used to compute metrics for an MLSE process in a more conventional manner. In this alternative, the values of Z1, Z2, Z3, Z4 are subtracted from the right hand side of the expressions to leave zero on the left in the noiseless case. Non-zero residuals on the left hand side are then squared and added to form a delta metric. Delta metrics are then accumulated with cumulative metrics for each state and states having the lowest cumulative metrics are selected to survive. The difference with this conventional MLSE metric, however, is that there is no updating of the channel estimates R1, R2, R3 and R4 for each ray. A separate updating procedure must then be used if the channel estimates are to be refined using data symbol decisions, in a "channel model per state" formulation similar to that first disclosed by Gudmundson in the above-incorporated '961 patent. The advantage of complex vector accumulation as disclosed above, however, is that averaged values for R1, R2, R3 and R4 are continuously available after each iteration.

U.S. Pat. Nos. 5,557,645 and 5,619,533 to Applicant, which are incorporated herein by reference, disclose an MLSE process that does not rely on deriving channel estimates by means of known pilot symbols. Such a device is often known as a "blind equalizer." The present invention can also be formulated as a blind equalizer. The process is initiated by hypothesizing a number of consecutive symbols such as S1, S2, S3. For each of these $M^3$ hypotheses, channel estimates (e.g., cumulative vector correlations) are formed for each supposed delayed ray. If any supposed ray has a negligible associated cumulative complex vector length, it may be deleted from the list of rays used for decoding. Non-negligible rays are used for decoding in the manner already described above for the case where the number of states does not contract upon encountering pilot symbols, but rather path history is forcibly truncated by extracting an oldest symbol from the best state. Rays which are currently negligible may nevertheless be used to provide associated cumulative vectors which are not used for decoding, in order to detect when, due to fading, they may become non-negligible and thus useable for decoding.

The above invention is particularly useful when the spreading factor used in a CDMA system is low, as may well be the case when CDMA is used to transmit high data rates as well as low data rates, such as digital speech rates. With low spreading factors, CDMA is less able to discriminate wanted information from ISI and IRI. By compensating for ISI and IRI in formulating an MLSE metric according to the above teachings, improved decoding of higher data rates is accomplished. A person skilled in the art may make other rearrangements of equations, such as expressions (1), (2), (3) and (4), in order to obtain useful MLSE metrics to compensate for ISI and IRI or to obtain data symbol-assisted channel estimation, all of which are considered to fall within the spirit and scope of this invention as described by the following claims.

As described in the above-incorporated '250 patent, decoders for successively decoding symbols can exhibit an improved performance under signal fading conditions if received signals are first digitized and committed to memory and then processed in a time-reversed order. Also disclosed in the '250 patent is the possibility to process both in normal and reverse-time order, selecting each decoded symbol from the decoding direction providing the highest likelihood indication. The invention described above is also amenable to the implementation of all of the forward or reversed-time decoding strategies disclosed in the '250 patent, as the same algorithms as described above can be used to successively extend hypothesized symbol sequences moving backwards from known pilot symbols or by moving forwards from known pilot symbols, or part one way and part the other. The cumulative complex correlations used in the preferred implementation as likelihood indications can serve as indications of the best decoding direction.

It is to be understood that the above-described embodiments are merely illustrative principles of this invention, and that many variations may be devised by those skilled in the art without departing from the scope of this invention. It is, therefore, intended that such variations be included in the scope of the appended claims.

I claim:

1. In a receiver for use in a wireless network, said receiver receiving signals carrying symbols over a plurality of channels, said symbols selected from a predefined set of symbols, said receiver having a memory storing a plurality of previously hypothesized sequences of symbols and a plurality of cumulative vectors, each describing one of the sequences of symbols, a method for decoding symbols in the received signal comprising the steps of:

generating a correlation vector by correlating the received signal over a symbol period using a plurality of time offsets equal to a number of elements of the correlation vector, the plurality of time offsets corresponding to selected ones of said plurality of channels;

generating a set of new symbol vectors at least in part by multiplying the correlation vector with a new symbol hypothesis selected in turn to be each of the symbols in said set of symbols;

hypothesizing a plurality of extended sequences of symbols by accumulating each of the set of new symbol vectors with each of the plurality of cumulative vectors; and determining the most likely extended sequences of symbols by combining the previously hypothesized symbols and one of the set of symbols corresponding to the combined cumulative vectors and new symbol vectors with the longest sum square lengths.

2. The method of claim 1 wherein the step of generating a set of new symbol vectors at least in part by multiplying each of said plurality of correlated vectors with each one of the set of symbols in turn comprises multiplying each of said plurality of correlated vectors with the complex conjugate of the value of the symbol.

3. The method of claim 1 wherein the step of accumulating each of the plurality of new symbol vectors with each of the plurality of cumulative vectors comprises vector addition of each of the plurality of new symbol vectors to each of the plurality of cumulative vectors.

4. The method of claim 1 wherein the step of determining the most likely sequence of symbols comprises selecting the set of symbols by maximum likelihood sequence estimation.

5. The method of claim 1 further including the step of storing the selected sequence of symbols as one of the previously hypothesized sequences of symbols in the memory and storing the combined cumulative vector and new symbol vector with the longest sum square length as the cumulative vector describing the one of the previously hypothesized sequences of symbols in the memory.

6. The method of claim 1 further including the step of converting the received signal to an intermediate frequency prior to generating the plurality of correlated vectors.

7. The method of claim 1 further including the step of converting the received signal to a digital representation of the received signal and the step of correlating comprises correlating the digital representation of the received signal.

8. The method of claim 1 in which said most likely extended sequences of symbols comprise the "M" most likely, where "M" is a fixed integer and likelihood is indicated by said sum-square cumulative vector lengths.

9. The method of claim 1 in which said most likely extended sequences comprise sequences which end in all possible combinations of the "L" most recently hypothesized symbols, where "L" is an integer and each sequence is the sequence of highest likelihood among all sequences that end with the same "L" symbol values, and likelihood is indicated by said sum-square lengths.

10. An improved receiver for decoding spread-spectrum coded signals received through multiple propagation channels to obtain decoded information symbols comprising:

a converter for converting received signals to representative numerical samples;

a correlator for correlating said numerical signal samples with a despreading code over each of said information symbol periods to obtain, for each symbol period, complex correlations for different time-alignments between said despreading code and said signal samples, each time-alignment corresponding to a different one of said multiple propagation channels;

hypothesizing means for generating data symbol hypotheses;

at least one multiplier for combining said data symbol hypotheses with said complex correlations to obtain channel estimates;

complex vector accumulation means for accumulating said channel estimates corresponding to the same one of said multiple propagation channels for successive symbol hypotheses to obtain cumulative complex vectors for each propagation channel; and selection means to generate a sum of the square of the lengths of the cumulative complex vectors and to select sequences of symbol hypotheses for which the sum of the squares of the lengths of the cumulative complex vectors is greatest.

11. The receiver of claim 10 in which said selected sequences comprise the "M" symbol sequences having the greatest associated sum-square cumulative vector length where "M" is a fixed integer.

12. The receiver of claim 10 in which said selected sequences comprise sequences which end in all possible combinations of the "L" most recently hypothesized data symbols and each selected sequence is the sequence having the greatest sum-square cumulative vector length among all sequences that end with the same "L" symbol values and "L" is an integer.

13. The improved receiver of claim 10 wherein said hypothesizing means comprises a Viterbi Maximum Likelihood Sequence Estimator.

14. The improved receiver of claim 10 in which said complex vector accumulation means includes means for de-weighting older accumulated channel estimates.

15. The improved receiver of claim 14 in which said means for de-weighting comprises means for subtracting a contribution of an oldest channel estimate from the respective cumulative complex vector.

16. The improved receiver of claim 14 in which said means for de-weighting comprises means for exponential de-weighting.

17. The improved receiver of claim 10 in which said complex vector accumulation means includes means for compensating for phase drift and frequency error.

18. The improved receiver of claim 17 wherein each cumulative complex vector has a phase angle and in which said frequency-error compensation means comprises means to rotate the phase angle of previous cumulative complex vectors before accumulating a new channel estimate.

19. The improved receiver of claim 10 in which said complex vector accumulation means includes compensation means to compensate for inter-symbol interference wherein said complex correlation for one symbol period is affected by the symbol value in at least one adjacent symbol period.

20. The improved receiver of claim 10 in which said complex vector accumulation means includes means to compensate for inter-ray interference in which said correlations for one path depend on the parameters of the other paths.

21. The improved receiver of claim 10 in which said complex vector accumulation means includes means to compensate said channel estimates for the effect of other paths and adjacent symbols before accumulating said channel estimates with the corresponding one of the multiple propagation channels.

22. The receiver of claim 10 in which said at least one multiplier multiplies said correlations by the complex conjugate of a symbol hypothesis.

23. The receiver of claim 10 in which said spread-spectrum coded signals comprise pilot symbols known to the receiver interspersed with unknown information symbols.

24. The receiver of claim 23 in which said symbol hypotheses comprises a single hypothesis for each of the known pilot symbols combined with multiple hypotheses for each of the unknown information symbols.

25. The receiver of claim 23 in which the number of said selected sequences of symbol hypotheses retained by the receiver diminishes upon receiving a pilot symbol.

26. The receiver of claim 25 in which said number of retained sequences diminishes to one after receiving a predetermined number of pilot symbols in succession.

27. The receiver of claim 10 in which said decoded information symbols comprise soft decisions.

28. The receiver of claim 27 further including comparing means for computing said soft decisions for each symbol from the sum of the square lengths of said cumulative complex vectors for one hypothesis of the symbol minus the sum of the squared lengths of said cumulative complex vectors for another hypothesis of the symbol.

29. The receiver of claim 28 further including scaling means for scaling said difference in squared lengths depending on the number of accumulated channel estimates accumulated in each cumulative complex vector.

30. A receiver for decoding spread-specturm coded signals received through multiple propagation channels to obtain decoded information symbols, wherein each symbol is encoded in one or more information symbol periods, said receiver comprising:

converter means for converting received signals to representative numerical samples;

correlation means for correlating said numerical signal samples with a despreading code over each of said information symbol periods to obtain, for each symbol period, complex correlations for different time-alignments between said despreading code and said signal samples, each time-alignment corresponding to a different one of said multiple propagation channels;

hypothesizing means for hypothesizing information symbol sequences;

channel estimation means for forming channel estimates for each of said multiple propagation paths at least in part by multiplying said complex correlations by said hypothesized information symbol sequences;

decision means to select a most likely of said hypothesized sequences using said channel estimates thereby decoding said information symbols.

31. The receiver of claim 30 wherein said hypothesizing means is a Maximum Likelihood Sequence Estimator.

32. The receiver of claim 30 wherein said channel estimation means includes a multiplier that multiplies hypothesized symbols with corresponding complex correlations to form a sum of the results.

33. The receiver of claim 31 wherein one of said hypothesized symbols and said corresponding complex correlations is complex-conjugated.

34. The receiver of claim 31 further including means for generating said sum as a weighted sum.

35. The receiver of claim 34 wherein said means for generating said weighted sum assigns a lower weight to older symbols and a higher weight to more recent symbols.

36. The receiver of claim 34 wherein said means for generating said weighted sum includes means for frequency and phase error compensation.

37. The receiver of claim 34 in which said decoded information symbols comprise soft decisions.

38. A receiver for decoding error-correction coded, interleaved and spread-spectrum modulated signals received through a multiple propagation paths to recover information symbols, wherein the information symbols are each encoded in one modulation interval, said receiver comprising:

converter means for converting received signals to representative numerical samples;

correlation means for correlating said numerical signal samples with a despreading code over each of the spread-spectrum modulation intervals to obtain, for each modulation interval, a corresponding set of complex correlations for different time-alignments between said despreading code and said signal samples, each time-alignment corresponding to a different one of said multiple propagation paths;

information symbol hypothesizing means for hypothesizing sequences of information symbols;

error-correction coding means for coding said hypothesized symbol sequences to produce coded modulation symbol sequence hypotheses;

de-interleaving means for selecting ones of said hypothesized modulation symbols from different timeslots for application by the error-correction coding means;

likelihood estimation means for combining said selected sets of correlations in order to produce a likelihood indication for each of said hypothesized information symbol sequences; and selection means for selecting an information symbol sequence having a greatest likelihood indication.

39. The receiver of claim 38 wherein said information symbol hypothesizing means comprises a Maximum Likelihood Sequence Estimator.

40. The receiver of claim 39 wherein said Maximum Likelihood Sequence Estimator includes means for forming a cumulative estimate of a complex signal amplitude for each of said multiple propagation paths.

41. The receiver of claim 40 wherein said means for forming cumulative estimates forms said cumulative estimates separately for portions of the received signal that are widely separated in time.

42. A method for decoding spread-spectrum modulated symbols received by multi-path propagation, each symbol being modulated during one modulation interval, said symbols including known symbols interspersed with unknown data symbol, said method comprising:

converting received signals to representative numerical signal samples;

correlating said numerical signal samples with a despreading code over each of the spread-spectrum modulation symbol intervals to obtain, for each modulation interval, a corresponding set of complex correlations for different time-alignments between said despreading code and said signal samples, each time-alignment corresponding to a different one of said multiple propagation paths;

initiating a Maximum Likelihood Sequence Estimator to a single starting state including a likelihood indication using sets of correlations corresponding to known pilot symbols interspersed before unknown data symbols;

information symbol hypothesizing means for hypothesizing sequences of information symbols;

successively hypothesizing unknown data symbols within said Maximum Likelihood Sequence Estimator and multiplying each new data symbol hypothesis by a corresponding set of correlations and combining with one or more of the previous states to obtain an expanded number of states, each corresponding to hypothesized sequences extended by one more unknown data symbol each having an associated likelihood indication;

selecting sequences having highest likelihood indications in order to keep the number of states at or below a maximum allowed number of states;

combining sets of correlations corresponding to pilot symbols interspersed after said unknown data symbols with the previous state or states in order to obtain an contracted number of states corresponding to a reduced number of hypothesized symbol sequences; and selecting from the reduced number of symbol sequences the hypothesized symbol sequence having the indication of highest likelihood thereby decoding said unknown symbols.

43. The method of claim 42 wherein said pilot symbols are denoted as being interspersed before or after unknown data symbols using a reversed time convention.

44. The method of claim 42 wherein decoding of some symbols only uses the reversed time convention and decoding of other symbols uses the normal time convention.

* * * * *